United States Patent
Huang et al.

(10) Patent No.: US 11,252,604 B2
(45) Date of Patent: Feb. 15, 2022

(54) DATA TRANSMISSION METHOD, APPARATUS, AND SYSTEM

(71) Applicant: Huawei Technologies Co., Ltd., Shenzhen (CN)

(72) Inventors: Qufang Huang, Shanghai (CN); Tingting Wang, Shenzhen (CN); Hao Bi, Rolling Meadows, IL (US); Yawei Lu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 277 days.

(21) Appl. No.: 16/455,720

(22) Filed: Jun. 27, 2019

(65) Prior Publication Data

US 2019/0327639 A1    Oct. 24, 2019

Related U.S. Application Data

(63) Continuation of application No. PCT/CN2017/119229, filed on Dec. 28, 2017.

(30) Foreign Application Priority Data

Dec. 30, 2016 (CN) .......................... 201611265112.5
Apr. 28, 2017 (CN) .......................... 201710296923.X

(51) Int. Cl.
*H04W 72/04* (2009.01)
*H04W 28/06* (2009.01)
(Continued)

(52) U.S. Cl.
CPC .......... *H04W 28/06* (2013.01); *H04L 1/1812* (2013.01); *H04W 28/16* (2013.01); *H04W 72/0446* (2013.01); *H04W 72/0493* (2013.01)

(58) Field of Classification Search
CPC . H04W 28/06; H04W 28/16; H04W 72/0446; H04W 72/0493; H04L 1/1812;
(Continued)

(56) References Cited

U.S. PATENT DOCUMENTS 7,542,457 B2    6/2009 Wu
2008/0095105 A1    4/2008 Sundberg et al.
(Continued)

FOREIGN PATENT DOCUMENTS

CN    102123399 A    7/2011
CN    103796320 A    5/2014
(Continued)

OTHER PUBLICATIONS

"Grant-free to grant-based switching for URLLC," 3GPP TSG-RAN WG1 #87, Reno, USA, R1-1612253, 3rd Generation Partnership Project, Valbonne, France (Nov. 14-18, 2016).
(Continued)

*Primary Examiner* — Edan Orgad
*Assistant Examiner* — Malick A Sohrab
(74) *Attorney, Agent, or Firm* — Leydig, Voit & Mayer, Ltd.

(57) ABSTRACT

A data transmission, by a terminal device, is described that improves data transmission efficiency while ensuring a transmission latency. The data transmission method includes sending a first transport block to a radio access device for X times by using a shared resource that is configured by the radio access device for at least one terminal, where the terminal is one of the at least one terminal, and X>0. The method further includes determining a dedicated resource allocated by the radio access device to the terminal, and sending the first transport block to the radio access device for Y times by using a target resource. The target resource includes the dedicated resource, and Y≥0.

17 Claims, 21 Drawing Sheets

(51) Int. Cl.
   *H04L 1/18* (2006.01)
   *H04W 28/16* (2009.01)
(58) Field of Classification Search
   CPC ..... H04L 5/0094; H04L 1/1896; H04L 1/188;
      H04L 1/1819; H04L 1/1887; H04L 1/189;
      H04L 1/08; H04L 1/00; H04L 1/0003;
      H04L 1/0017; H04L 1/1858
   See application file for complete search history.

(56) References Cited

U.S. PATENT DOCUMENTS

| | | | |
|---|---|---|---|
| 2009/0154415 A1 | 6/2009 | Park et al. | |
| 2013/0028219 A1 | 1/2013 | Lee et al. | |
| 2014/0079039 A1* | 3/2014 | Terry | H04L 1/1877 370/336 |
| 2015/0304921 A1 | 10/2015 | Hong et al. | |
| 2015/0312793 A1 | 10/2015 | Jeon et al. | |
| 2015/0327245 A1* | 11/2015 | Zhu | H04W 72/0413 370/329 |
| 2016/0057773 A1 | 2/2016 | Quan et al. | |
| 2016/0127092 A1* | 5/2016 | Zhang | H04L 5/0051 370/329 |
| 2018/0249494 A1* | 8/2018 | Matsumoto | H04W 84/12 |
| 2018/0262945 A1* | 9/2018 | Yi | H04W 28/0278 |
| 2019/0174472 A1* | 6/2019 | Lee | H04W 72/044 |

FOREIGN PATENT DOCUMENTS

| | | |
|---|---|---|
| CN | 106134249 A | 11/2016 |
| RU | 2575414 C2 | 2/2016 |
| WO | 2016085621 A1 | 6/2016 |
| WO | 2016086093 A2 | 6/2016 |
| WO | 2016148243 A1 | 9/2016 |
| WO | 2016175029 A1 | 11/2016 |
| WO | 2016190592 A1 | 12/2016 |

OTHER PUBLICATIONS

"Grant-free transmission scheme for UL URLLC," 3GPP TSG RAN WG1 Meeting #87, Reno, Nevada, USA, R1-1611689, 3rd Generation Partnership Project, Valbonne, France (Nov. 14-18, 2016).

"Considerations on grant free transmission for NR," 3GPP TSG-RAN WG2 Meeting #96, Reno, Nevada, USA, R2-168478, 3rd Generation Partnership Project, Valbonne, France (Nov. 14-18, 2016).

"The retransmission and HARQ schemes for grant-free," 3GPP TSG RAN WG1 Meeting #86bis, Lisbon, Portugal, R1-1608859, pp. 1-5, 3rd Generation Partnership Project, Valbonne, France (Oct. 10-14, 2016).

"Solutions for collisions of MA signatures," 3GPP TSG RAN WG1 Meeting #86bis, Lisbon, Portugal, R1-1608860, pp. 1-5, 3rd Generation Partnership Project, Valbonne, France (Oct. 10-14, 2016).

* cited by examiner

DATA TRANSMISSION METHOD, APPARATUS, AND SYSTEM

CROSS-REFERENCE TO RELATED APPLICATIONS

This application is a continuation of International Application No. PCT/CN2017/119229, filed on Dec. 28, 2017, which claims priority to Chinese Patent Application No. 201611265112.5, filed on Dec. 30, 2016 and Chinese Patent Application No. 201710296923.X, filed on Apr. 28, 2017, all of which are incorporated herein by reference in their entireties.

TECHNICAL FIELD

Embodiments of the present application relate to the field of communications technologies, and in particular, to a data transmission method, apparatus, and system.

BACKGROUND

An ultra-reliable and low latency communications (URLLC) service is one of typical services in a 5th Generation mobile communications technology (5G) system. The URLLC service has a relatively high requirement for a transmission latency, and usually requires that a transmission latency of a transport block (TB) of URLLC data in an access network is less than 0.5 ms.

In this way, to minimize a latency generated during TB transmission, a radio access device (e.g., a base station) may allocate a radio resource (which is referred to as a shared resource in embodiments of the present application) to a plurality of terminals in advance. For example, a radio resource allocated by the radio access device to a terminal 1 to a terminal 5 is a specific frequency band within a transmission time unit 3 to a transmission time unit 5. In this case, when a specific terminal such as the terminal 1 needs to send the URLLC data subsequently, the terminal may directly send the TB of the URLLC data by using the allocated shared resource.

However, the plurality of terminals all share the shared resource, that is, each terminal may use the shared resource. Therefore, a case in which the plurality of terminals simultaneously send different TBs by using the same resource occurs. For example, the terminal 1 sends a TB1 within the transmission time unit 3, and the terminal 2 sends a TB2 within the transmission time unit 3. In this case, when channel quality is relatively poor, the radio access device cannot correctly decode the TB1 and the TB2, that is, cannot correctly receive data transmitted by the terminal 1 and the terminal 2, resulting in decreased data transmission efficiency.

SUMMARY

Embodiments of the present application provide a data transmission method, apparatus, and system, to improve data transmission efficiency while ensuring a transmission latency requirement.

To achieve the foregoing objectives, the following technical solutions are used in the embodiments of the present application.

According to a first aspect, an embodiment of the present application provides a data transmission method, including: A terminal may firstly send a first transport block to a radio access device for X (X>0) times, by using a shared resource that is configured by the radio access device for at least one terminal, to reduce a latency since the terminal waits for a dedicated resource allocated by the radio access device. After the terminal determines the dedicated resource allocated by the radio access device to the terminal, the terminal continues to send the first transport block to the radio access device for Y (Y≥0) times, by using a target resource including the dedicated resource. Because the dedicated resource is a resource specially allocated by the radio access device to the terminal, the dedicated resource used by the terminal does not collide with a resource used by another terminal. This increases a probability of correctly receiving the first transport block by the radio access device, in other words, transmission efficiency of the first transport block is improved.

In a possible design method, the target resource further includes the shared resource. To be specific, after the terminal obtains the dedicated resource allocated by the radio access device, the terminal may continue to transmit the first transport block by using the shared resource while transmitting the first transport block by using the dedicated resource, thereby reducing a transmission latency of the first transport block.

In a possible design method, the method further includes: if a preset stop condition is met, stopping, by the terminal, sending the first transport block to the radio access device, where the stop condition includes: the terminal receives an acknowledgment response to the first transport block, which is sent by the radio access device, or a time for sending the first transport block by the terminal exceeds a preset latency indicator.

In a possible design method, before the sending, by the terminal, a first transport block to a radio access device for X times, by using a shared resource preconfigured by the radio access device, the method further includes: calculating, by the terminal, a quantity N of times required for transmitting the first transport block, where N>0. In this case, the stop condition further includes: X+Y≥N. In other words, when a sum of the quantity X of times of sending the first transport block and the quantity Y of times of sending the first transport block is greater than or equal to N, the terminal may stop sending the first transport block to the radio access device. Optionally, the terminal may clear the first transport block in a buffer, to save transmission resources.

In a possible design method, the sending, by the terminal, a first transport to a radio access device for X times, by using a shared resource preconfigured by the radio access device includes: sending, by the terminal within a preset time period, the first transport block to the radio access device one by one for the X times by using the shared resource, where an end time of the preset time period is prior to a time at which the terminal obtains the dedicated resource. In this way, the preset time period is set, so that the terminal may transmit the first transport block only within the preset time period by using the shared resource. Once the preset time period elapses, the terminal no longer transmits the first transport block by using the shared resource, but waits for the dedicated resource allocated by the radio access device to the terminal and transmits the first transport block by using the dedicated resource, so that the another terminal preempts the shared resource to send data.

In a possible design method, the sending, by the terminal, the first transport block to the radio access device for Y times by using a target resource includes: for any transmission time unit within which the target resource is located, if the transmission time unit includes both the dedicated resource and the shared resource, sending, by the terminal, the first transport block by using the dedicated resource within the transmission time unit because the dedicated resource does not collide with the resource used by the another terminal.

In a possible design method, the shared resource is located within each of Z (Z≥X) transmission time units, and the method further includes: if the terminal obtains a transmission request of a second transport block within an $M^{th}$ transmission time unit (the Mt transmission time unit is a transmission time unit, other than a first transmission time unit, in the Z transmission time units) in the Z transmission time units, sending, by the terminal, the first transport block within the $M^{th}$ transmission time unit by using a shared resource within the $M^{th}$ transmission time unit. This can ensure that the transmission of the second transport block does not cause an increased transmission latency of the first transport block that has been started to be transmitted.

In a possible design method, before the sending, by the terminal, a first transport block to a radio access device for X times by using a shared resource preconfigured by the radio access device, the method further includes: inserting, by the terminal, first indication information into the first transport block, where the first indication information includes a HARQ process identification and a new data indicator NDI that are of the first transport block to be transmitted by the terminal.

In a possible design method, the first indication information further includes an identity of a cell in which the terminal transmits the first transport block most recently. In this way, when the terminal sends the first transport block to the radio access device by using shared resources in different cells, the radio access device can merge, according to the first indication information, data of the first transport block received for a plurality of times, to correctly receive the first transport block.

In a possible design method, the obtaining, by the terminal, the dedicated resource allocated by the radio access device to the terminal includes: receiving, by the terminal, resource allocation information sent by the radio access device, where the resource allocation information is used to indicate the dedicated resource required for sending the first transport block by the terminal.

The resource allocation information includes second indication information, and the second indication information is used to instruct the terminal to repeatedly send the first transport block transmitted within transmission time unit K (K≥0). In this way, the terminal may send, according to the second indication information and on the dedicated resource allocated by the radio access device, the first transport block by using the HARQ process ID used when the first transport block is sent within the transmission time unit K. In other words, the radio access device can implicitly indicate, to the terminal by using the second indication information, the HARQ process ID used for sending the first transport block.

In a possible design method, the second indication information includes an identity of a cell in which the terminal transmits the first transport block within the transmission time unit K. In this way, when the terminal sends the first transport block to the radio access device by using shared resources in different cells, the radio access device can merge, according to the second indication information, data of the first transport block received for a plurality of times, to correctly receive the first transport block.

In a possible design method, the shared resource includes a first resource configured in a first cell by the radio access device for the terminal and a second resource configured in a second cell by the radio access device for the terminal. In this case, the method further includes: receiving, by the terminal, an acknowledgment response to the first transport block, which is sent by the radio access device through the first cell, and stopping, by the terminal, sending the first transport block to the radio access device by using the second resource. In this way, the terminal can also send a same transport block by using resources in a plurality of cells without performing inter-cell data merging.

According to a second aspect, an embodiment of the present application provides a terminal, including: a transmission unit, configured to send a first transport block to a radio access device for X times by using a shared resource that is configured by the radio access device for at least one terminal, where the terminal is one of the at least one terminal, and X>0; and a determining unit, configured to determine a dedicated resource allocated by the radio access device to the terminal, where the transmission unit is further configured to send the first transport block to the radio access device for Y times by using a target resource, where the target resource includes the dedicated resource, and Y≥0.

In a possible design method, the transmission unit is specifically configured to: if a preset stop condition is met, stop sending the first transport block to the radio access device, where the stop condition includes: the terminal receives an acknowledgment response to the first transport block, which is sent by the radio access device, or a time for sending the first transport block by the terminal exceeds a preset latency indicator.

In a possible design method, the determining unit is further configured to determine a quantity N of times required for transmitting the first transport block, where N>0, and the stop condition further includes: X+Y≥N.

In a possible design method, the transmission unit is specifically configured to: within a preset time period, send the first transport block to the radio access device one by one for X times by using the shared resource, where an end time of the preset time period is prior to a time at which the terminal obtains the dedicated resource.

In a possible design method, the transmission unit is specifically configured to: for any transmission time unit within which the target resource is located, if the transmission time unit includes both the dedicated resource and the shared resource, send the first transport block by using the dedicated resource within the transmission time unit.

In a possible design method, the shared resource is located within each of Z transmission time units, where Z≥X. The transmission unit is further configured to: if the terminal obtains a transmission request of a second transport block within an $M^{th}$ transmission time unit in the Z transmission time units, send the first transport block within the $M^{th}$ transmission time unit by using a shared resource within the $M^{th}$ transmission time unit, where the $M^{th}$ transmission time unit is a transmission time unit, other than a first transmission time unit, in the Z transmission time units.

In a possible design method, the terminal further includes: an insertion unit, configured to insert first indication information into the first transport block, where the first indication information includes a HARQ process identification and an NDI that are of the first transport block to be transmitted by the terminal.

In a possible design method, the transmission unit is further configured to receive resource allocation information sent by the radio access device, where the resource allocation information is used to indicate the dedicated resource required by the terminal for sending the first transport block, the resource allocation information includes second indication information, the second indication information is used to instruct the terminal to repeatedly send the first transport block transmitted within a transmission time unit K, and the transmission time unit K is a transmission time unit prior to a transmission time unit within which the resource allocation information is received, where K≥0.

In a possible design method, the shared resource includes a first resource configured in a first cell by the radio access device for the terminal and a second resource configured in a second cell by the radio access device for the terminal; and the transmission unit is further configured to: receive an acknowledgment response to the first transport block, which is sent by the radio access device by using the first cell, where the acknowledgment response is generated by the radio access device after the radio access device receives the first transport block sent by the terminal by using the first resource; and stop sending the first transport block to the radio access device by using the second resource.

According to a third aspect, an embodiment of the present application provides a terminal, including: a processor, a memory, a bus, and a communications interface. The memory is configured to store a computer executable instruction; the processor is connected to the memory through the bus; and when the terminal runs, the processor executes the computer executable instruction stored in the memory, so that the terminal performs the data transmission method according to any one of the design methods in the first aspect.

According to a fourth aspect, an embodiment of the present application provides a data transmission system. The system includes any one of the foregoing terminals and the radio access device connected to the terminal.

According to a fifth aspect, an embodiment of the present application provides a computer storage medium, configured to store a computer software instruction used by the foregoing terminal. The computer software instruction includes a program designed for the terminal to perform the foregoing aspects.

According to sixth aspect, an embodiment of the present application provides a computer program, where the computer program includes an instruction, and when the computer program is executed by a computer, the computer performs the method according to any one of the design methods in the first aspect.

In the present application, names of the terminal or the radio access device impose no limitation on the devices. During actual implementation, these devices may have other names. The devices shall fall within the scope of the claims of the present application and equivalent technologies thereof provided that functions of the devices are similar to the present application.

In addition, for technical effects brought by any design manner in the second aspect to the sixth aspect, refer to the technical effects brought by different design manners in the first aspect. Details are not described herein again.

Another aspect in the embodiments of this embodiment provides a data transmission method, including: generating, by a terminal, a transport block at a media access control (MAC) layer, where the transport block includes data of one of at least two radio link control (RLC) entities, and the at least two RLC entities are mapped to one first packet data convergence protocol (PDCP) entity; and sending, by the terminal to a radio access device through a physical layer of the terminal, information carried in the transport block.

In this embodiment, the transport block excludes data of another RLC entity, different from the RLC entity, in the at least two RLC. Optionally, the transport block alternatively includes data of one RLC entity, and the RLC entity is mapped to a second PDCP entity. The first PDCP is different from the second PDCP entity.

Optionally, this embodiment includes: collecting, by the terminal, statistics about an amount of to-be-transmitted data: an amount of currently-to-be-transmitted data of all PDCP entities in a first group of PDCP entities, an amount of to-be-transmitted data of all RLC entities corresponding to all the PDCP entities in the first group of PDCP entities, an amount of currently-to-be-transmitted data of each PDCP entity in a second group of PDCP entities×a quantity of copies of a data packet made by each PDCP entity, and an amount of to-be-transmitted data of each of the at least two RLC entities that corresponds to each PDCP entity in the second group. For example, the first group of PDCP entities is the first PDCP entity, the second group of PDCP entities is the second PDCP entity, the first PDCP entity does not make a copy of a data packet (or generates only one RLC data packet) at an RLC layer, the second PDCP entity makes at least two copies of a data packet at the RLC layer, and each copy of the data packet is carried on one RLC entity. In this case, the amount of to-be-transmitted data is equal to: an amount of currently-to-be-transmitted data of the first PDCP entity+an amount of to-be-transmitted data of an RLC entity to which the first PDCP entity is mapped+an amount of currently-to-be-transmitted data of the second PDCP entity×a quantity of copies made by the second PDCP entity at the RLC layer+an amount of to-be-transmitted data of all the RLC entities to which the second PDCP entity is mapped.

Optionally, this embodiment further includes: determining, by the terminal, whether wanted data of all the RLC entities mapped to a same MAC entity is all sent at the RLC layer, where the wanted data is data that can be added to a currently-to-be-transmitted transport block by the MAC entity. If the wanted data of all the RLC entities has not been sent completely, and a BSR has not been sent, the terminal keeps a triggering state of the BSR. If the wanted data has been sent completely, the terminal cancels a triggering state of the BSR. If the wanted data of all the RLC entities has not been sent completely, and a BSR has been sent to the radio access device, the terminal cancels a triggering state of the BSR.

The technical solution provided in this embodiment may be applied to the first aspect to the sixth aspect and the technical solutions provided in the possible design methods.

These aspects or other aspects of the present application are more concise and comprehensible in descriptions of the following embodiments.

DESCRIPTION OF EMBODIMENTS

Figure 1:
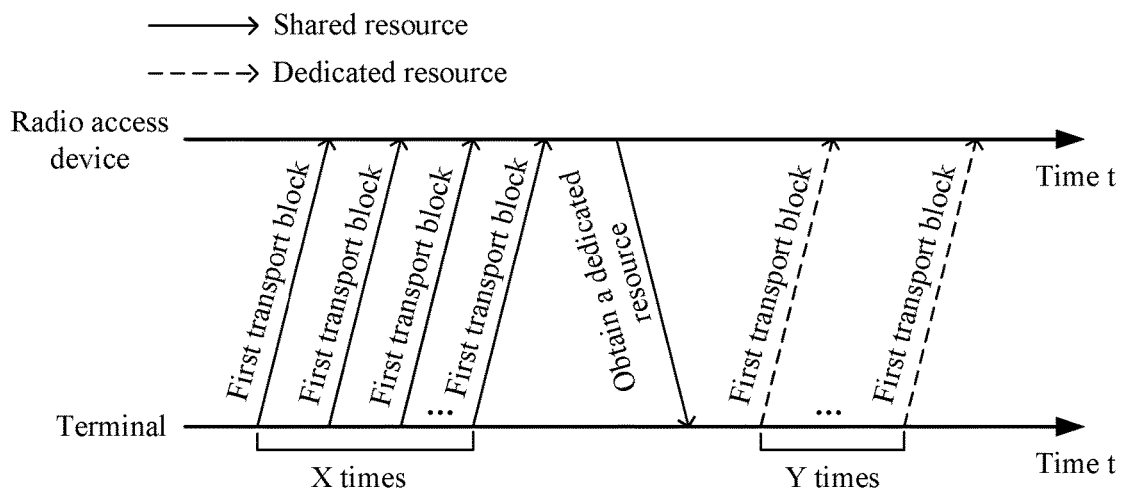
FIG. 1 is a schematic diagram 1 of an application scenario of a data transmission method according to an embodiment of the present application.

The following describes the technical solutions in the embodiments of the present application in detail with reference to the accompanying drawings in the embodiments of the present application.

In addition, the terms "first" and "second" are merely intended for a purpose of description, and shall not be understood as an indication or implication of relative importance or implicit indication of the number of indicated technical features. Therefore, a feature limited by "first" or "second" may explicitly or implicitly include one or more features. In the descriptions of the embodiments of the present application, "plurality" means at least two, unless otherwise specified.

For ease of understanding the embodiments of the present application, several terms introduced into the descriptions of the embodiments of the present application are first described herein.

A terminal, which may also be referred to as user equipment (UE), may be specifically a mobile phone, a tablet computer, a notebook computer, a ultra-mobile personal computer (UMPC), a netbook, a personal digital assistant (PDA), or the like. This is not limited in the embodiments of the present application.

A radio access device may be an radio access point (AP) or a base station (e.g., a macro base station, a micro base station, and a repeater). This is not limited in the embodiments of the present application.

A transmission time unit refers to a time granularity used for uplink transmission or downlink transmission, and may be specifically a transmission time unit, a slot, a mini-slot, an aggregated slot, an aggregated mini-slot, or the like. Using the transmission time unit as an example, in an long term evolution (LTE) system, a time length of a transmission time unit is usually 1 ms; and in a 5G system, a time length of a transmission time unit may be set by a base station. This is not limited in the embodiments of the present application.

The embodiments of the present application provide a data transmission method, and the method may be applied to a data transmission process between a terminal and a radio access device. Using a hybrid automatic repeat request (HARQ) transmission mode as an example, in the prior art, a radio access device needs to first allocate, to a terminal, a dedicated resource used for sending data by the terminal, and then, the terminal sends to-be-transmitted data to the radio access device by using the dedicated resource allocated by the radio access device to the terminal. If the data that is transmitted once cannot be correctly received by the radio access device, the terminal further needs to repeatedly send the data to the radio access device, until the data is correctly received by the radio access device.

However, a latency of at least 4 ms is required when the radio access device allocates the dedicated resource to the terminal, and a latency of at least 8 ms is required between sending the data by the terminal to the radio access device for the first time and sending the data by the terminal to the radio access device for the second time. This cannot meet a latency requirement of URLLC data.

In this regard, in the prior art, the radio access device may alternatively allocate one or more shared resources to a plurality of terminals in advance. In this case, when a specific terminal needs to send URLLC data, the specific terminal may directly send the URLLC data by using the allocated shared resource. The shared resource is shared by the plurality of terminals, and consequently the plurality of terminals simultaneously preempt the same shared resource to send different data. As a result, the radio access device cannot correctly decode received URLLC data, and the transmitted data cannot be correctly received by the radio access device, thereby decreasing transmission efficiency of the URLLC data. In other words, when one shared resource is available for one terminal, the terminal usually does not know whether the shared resource is used by another terminal. The shared resource is pre-allocated by the radio access device to at least one terminal, and the shared resource does not need to be dynamically granted by the radio access device. Because the terminal using the shared resource does not know whether the resource is being used by the another terminal, the plurality of terminals preempt the shared resource to cause the collision as a result.

It can be learned that a transmission latency and transmission efficiency of the URLLC data cannot be ensured regardless of transmitting the URLLC data by the terminal by using the dedicated resource or the shared resource.

To resolve the foregoing problem, the embodiments of the present application provide a data transmission method. When the terminal needs to transmit URLLC data (the URLLC data may include one or more transport blocks) to the radio access device, for example, transmit a first transport block, as shown in FIG. 1, the terminal may first send the first transport block to the radio access device for X times (X>0) by using a preset shared resource; when the terminal obtains a dedicated resource allocated by the radio access device to the terminal, if the terminal has not received an acknowledgment response sent after the radio access device correctly receives the first transport block, the terminal may send the first transport block to the radio access device for Y times (Y≥0) by using a target resource (the target resource includes the dedicated resource), until the radio access device correctly receives the first transport block.

In this way, before obtaining the dedicated resource allocated by the radio access device, the terminal may send the first transport block by using the shared resource shared with another terminal, to reduce a latency caused because the terminal waits for the dedicated resource allocated by the radio access device. However, after the terminal obtains the dedicated resource allocated by the radio access device, the terminal may send the first transport block by using the target resource including the dedicated resource, because the dedicated resource is a resource specially allocated by the radio access device to the terminal and the dedicated resource used by the terminal does not collide with a resource used by the another terminal. This increases a probability of correctly receiving the first transport block by the radio access device, that is, improves transmission efficiency of the first transport block.

Figure 2:
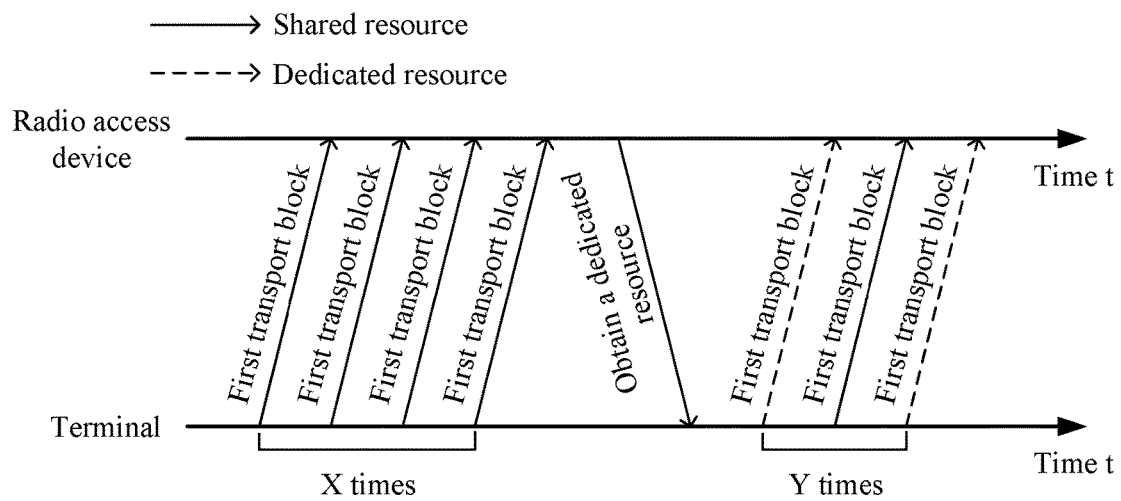
FIG. 2 is a schematic diagram 2 of an application scenario of a data transmission method according to an embodiment of the present application.

Certainly, as shown in FIG. 2, the target resource may further include the shared resource. To be specific, after the terminal obtains the dedicated resource allocated by the radio access device, the terminal may continue to transmit the first transport block by using the shared resource while transmitting the first transport block by using the dedicated resource, thereby reducing a transmission latency of the first transport block.

Figure 3:
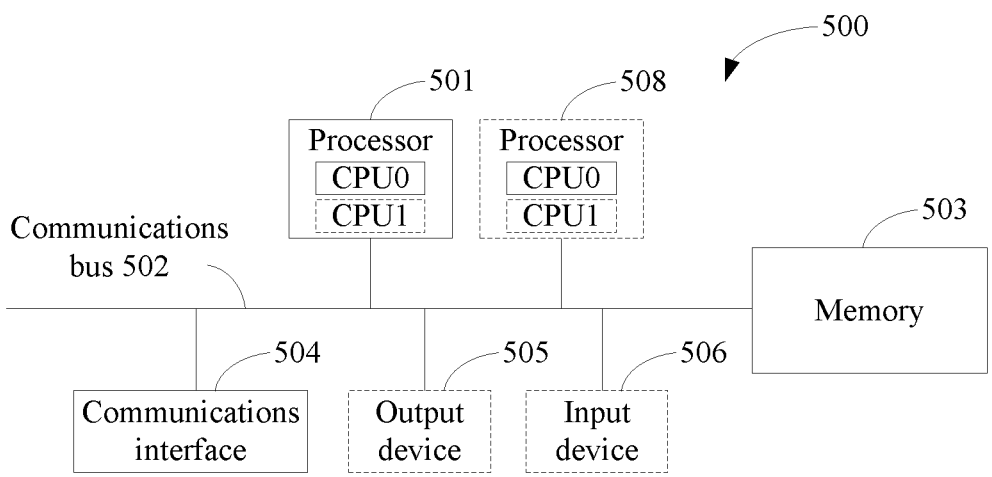
FIG. 3 is a schematic structural diagram 1 of a terminal according to an embodiment of the present application.

As shown in FIG. 3, the terminal may be implemented in a form of a computer device (or a system) in FIG. 3.

FIG. 3 is a schematic diagram of a computer device according to an embodiment of the present application. The computer device 500 includes at least one processor 501, a communications bus 502, a memory 503, and at least one communications interface 504.

The processor 501 may be a general-purpose central processing unit (CPU), a microprocessor, an application-specific integrated circuit (ASIC), or one or more integrated circuits configured to control program execution in the solutions of the present application.

The communications bus 502 may include a channel and transmits information between the foregoing components. The communications interface 504 uses any transceiver like apparatus to communicate with another device or a communications network, such as an Ethernet, a radio access network (RAN), or a wireless local area network (WLAN).

The memory 503 may be a read-only memory (ROM) or another type of static storage device capable of storing static information and instructions, or a random access memory (RAM) or another type of dynamic storage device capable of storing information and instructions, or may be an electrically erasable programmable read-only memory (EEPROM), a compact disc read-only memory (CD-ROM) or other optical disc storage, optical disc storage (e.g., a compact disc, a laser disc, an optical disc, a digital versatile disc, a Blu-ray disc, or the like), a magnetic disk storage medium or another magnetic storage device, or any other medium that can be used to carry or store expected program code in an instruction or data structure form and that can be accessed by a computer, but is not limited thereto. The memory may exist independently, and is connected to the processor through the bus. Alternatively, the memory may be integrated with the processor.

The memory 503 is configured to store application program code for performing the solutions of the present application, and the processor 501 controls the execution. The processor 501 is configured to execute the application program code stored in the memory 503.

During specific implementation, in an embodiment, the processor 501 may include one or more CPUs, for example, a CPU0 and a CPU1 in FIG. 3.

During specific implementation, in an embodiment, the computer device 500 may include a plurality of processors, for example, the processor 501 and a processor 508 in FIG. 3. Each of the processors may be a single-core (single-CPU) processor or a multi-core (multi-CPU) processor. The processors herein may be one or more devices, circuits, and/or processing cores for processing data (e.g., a computer program instruction).

During specific implementation, in an embodiment, the computer device 500 may further include an output device 505 and an input device 506. The output device 505 communicates with the processor 501, and may display information in a plurality of manners. For example, the output device 505 may be a liquid crystal display (LCD), a light emitting diode (LED) display device, a cathode ray tube (CRT) display device, a projector, or the like. The input device 506 communicates with the processor 501, and may receive a user input in a plurality of manners.

The computer device 500 may be a general-purpose computer device or a dedicated computer device. During specific implementation, the computer device 500 may be a desktop computer, a portable computer, a network server, a personal digital assistant (PDA), a mobile phone, a tablet computer, a wireless terminal device, a communications device, an embedded device, or a device with a structure similar to that in FIG. 3. This embodiment of the present application does not limit a type of the computer device 500.

Figure 4:
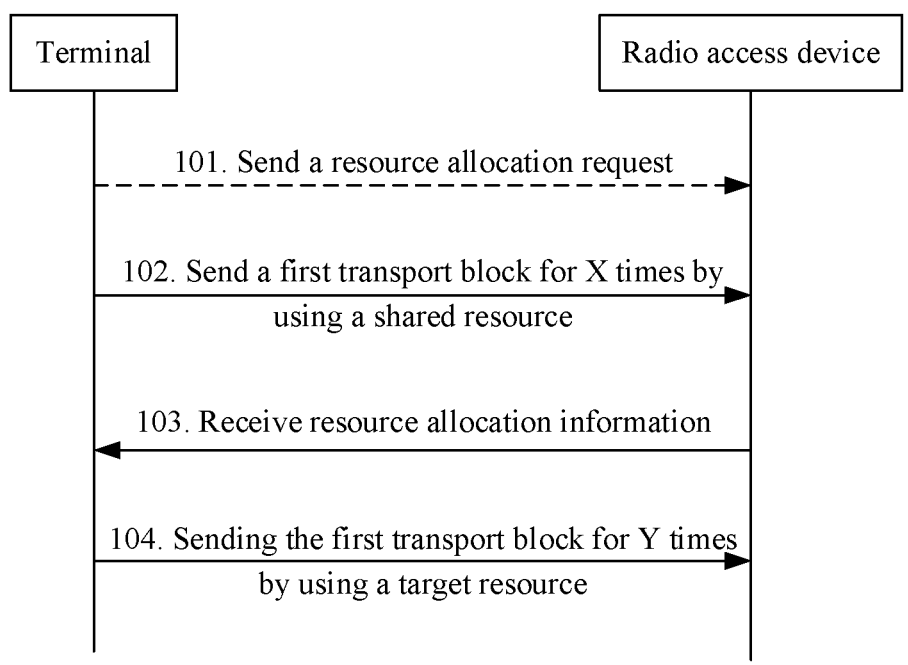
FIG. 4 is a schematic interaction diagram of a data transmission method according to an embodiment of the present application.

The following describes a data transmission method according to an embodiment of the present application in detail with reference to specific embodiments. As shown in FIG. 4, the method includes the following steps.

101 (Optional). A terminal sends a resource allocation request to a radio access device, where the resource allocation request is used to request the radio access device to allocate, to the terminal, a dedicated resource used for transmitting a first transport block.

Specifically, when an access stratum in the terminal receives to-be-sent data from an application layer, the terminal may divide the to-be-sent data into one or more transport blocks (TB) based on a preset transport block size. The terminal may send the resource allocation request to the radio access device when determining that a to-be-sent transport block is URLLC data. The radio access device allocates the dedicated resource to the terminal after receiving the resource allocation request. For example, the dedicated resource is located within a fifth transmission time unit, a seventh transmission time unit, and a ninth transmission time unit. The dedicated resource is specially allocated by the radio access device to the terminal, and therefore, the dedicated resource does not collide with a resource used when another terminal transmits data.

For example, the terminal may always keep a resource request suspended state, that is, the terminal sends the resource allocation request to the radio access device provided that there is a resource, until the terminal obtains the dedicated resource; or the terminal may always keep a resource request suspended state, until the terminal successfully sends the first transport block to the radio access device.

102. Before obtaining the dedicated resource, the terminal sends the first transport block to the radio access device for X (X>0) times by using a shared resource.

The shared resource is a resource allocated by the radio access device to at least one terminal (including the foregoing terminal). For example, the radio access device allocates a shared resource 1 to a terminal 1 to a terminal 3 in a cell 1. In this case, when any one of the terminal 1 to the terminal 3 needs to transmit data, the terminal may interact with the radio access device by using the shared resource 1.

Figure 5A:
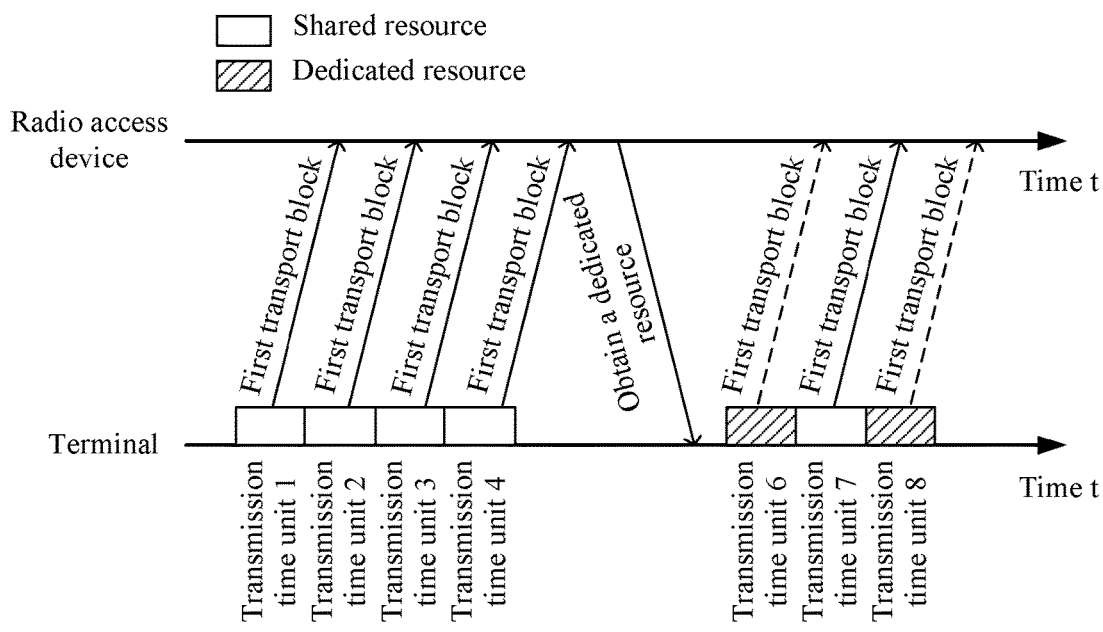
FIG. 5A is a schematic diagram 3 of an application scenario of a data transmission method according to an embodiment of the present application.

Specifically, as shown in FIG. 5A, the shared resource may be distributed within one or more transmission time units. To enable the radio access device to correctly receive the first transport block as soon as possible, in step 102, the terminal may first send the first transport block to the radio access device for the X (X>0) times by using the shared resource.

In a possible implementation, as shown in FIG. 5A, shared resources are distributed within transmission time units 1 to 4 and a transmission time unit 7. However, a size of a shared resource distributed by the radio access device within each transmission time unit is different. For example, shared resources within the transmission time unit 1, the transmission time unit 3, and the transmission time unit 7 have a size of 30 bytes, and shared resources within the transmission time unit 2 and the transmission time unit 4 have a size of 50 bytes. In this case, the terminal may select, based on a size of the first transport block, a transmission time unit whose shared resource size is greater than or equal to the size of the first transport block, such as the transmission time unit 2 and the transmission time unit 4, for sending the first transport block to the radio access device.

Optionally, the transmission time unit may be specifically referred to as a transmission time interval (TTI).

Figure 5B:
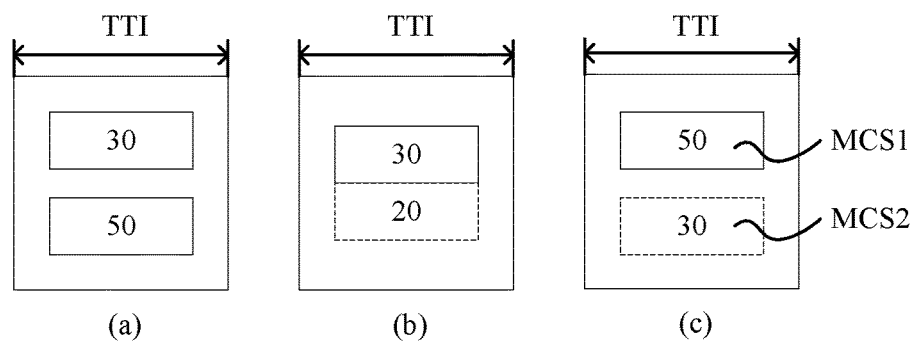
FIG. 5B is a schematic diagram 4 of an application scenario of a data transmission method according to an embodiment of the present application.

Further, as shown in FIG. 5B(a), for a TTI in which a shared resource is distributed, two shared resources of different sizes may be configured in the TTI, for example, 30 bytes (a shared resource 1) and 50 bytes (a shared resource 2). In this case, the terminal may determine, based on the size of the first transport block, whether a size of the shared resource 1 or the shared resource 2 in the current TTI is greater than or equal to the size of the first transport block. If the shared resource 1 and the shared resource 2 meet the condition (both are greater than or equal to the size of the first transport block), the terminal may randomly select either the shared resource 1 or the shared resource 2 to transmit the first transport block; if only one shared resource meets the condition (a size of only one of the shared resource 1 and the shared resource 2 is greater than or equal to the size of the first transport block), for example, the shared resource 2, the terminal may transmit the first transport block by using the shared resource 2; if neither of the two shared resources meets the condition, the terminal may continue to wait until a shared resource that meets the condition arrives.

Alternatively, as shown in FIG. 5B(b), for a TTI in which a shared resource is distributed, a shared resource of a fixed size may be configured in the TTI, for example, 50 bytes. A shared resource of 30 bytes in 50 bytes has a higher priority. In this case, when the terminal needs to transmit the first transport block by using the shared resource, the terminal first determines whether the shared resource of 30 bytes with the higher priority is able to meet a transmission requirement. When the size of the first transport block is greater than 30 bytes and does not exceed 50 bytes, the terminal may transmit the first transport block by using the shared resource of 50 bytes. Correspondingly, when the size of the first transport block is greater than 50 bytes, the terminal may continue to wait until a shared resource that meets the condition arrives.

Alternatively, as shown in FIG. 5B (c), for a TTI in which a shared resource is a distributed, the shared resource configured in the TTI has a fixed size in time-frequency domain. However, when the terminal transmits a transport block by using different modulation and coding schemes (MCSs), the shared resource may carry data of different sizes. For example, when the terminal transmits the transport block by using an MCS 1, the shared resource may carry data of 50 bytes; or when the terminal transmits the transport block by using an MCS 2, the shared resource may carry data of 30 bytes. In this way, when the terminal needs to transmit the first transport block by using the shared resource, the terminal may select, based on the size of the first transport block, an appropriate MCS to transmit the first transport block on the shared resource.

Figure 6:
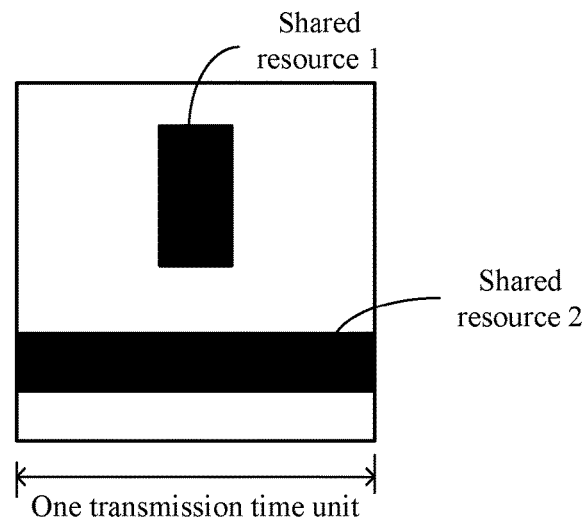
FIG. 6 is a schematic diagram 5 of an application scenario of a data transmission method according to an embodiment of the present application.

In another possible implementation, as shown in FIG. 6, for a specific transmission time unit, the radio access device may distribute a plurality of shared resources within the transmission time unit, for example, a shared resource 1 and a shared resource 2 in FIG. 6. In this case, when sending the first transport block within the transmission time unit, the terminal may select one of the plurality of shared resources to send the first transport block.

For example, the terminal may select a shared resource having an earliest resource start location, namely, the shared resource 2; in this case, the terminal may transmit the first transport block as soon as possible by using the shared resource 2. Alternatively, the terminal may select a shared resource having an earliest resource end location, namely, the shared resource 1; in this case, the terminal may send the first transport block as soon as possible. Alternatively, the terminal may select a shared resource with highest reliability based on reliability of the plurality of shared resources to transmit the first transport block, to improve reliability of a transmission process. This is not limited in this embodiment of the present application.

For example, if a shared resource is located in a frequency band with a low frequency, the shared resource has higher reliability; otherwise, the shared resource has lower reliability. If a shared resource is located in a licensed spectrum, the shared resource has higher reliability; otherwise, the shared resource has lower reliability.

Alternatively, when configuring each shared resource for the terminal, the radio access device may also configure a priority of each shared resource. Configuration of the priority of each shared resource for different terminals may be different. For example, in FIG. 6, a priority of the shared resource 1 is higher than a priority of the shared resource 2. In this case, during data transmission, the terminal may select the shared resource with a highest priority to transmit data. Optionally, if the shared resource with the highest priority is insufficient for completely transmitting the data, the terminal selects a shared resource with a second highest priority. In this way, URLLC data to be sent by the plurality of terminals may be averagely distributed to all shared resources, thereby reducing a probability of resource collisions between terminals.

Further, still as shown in FIG. 6, if the terminal selects the shared resource 1 to transmit the first transport block, whether the shared resource 2 and a remaining resource in the shared resource 1 (which are referred to as remaining resources in this embodiment of the present application) can be used to transmit data or what data is to be transmitted by a user may be specified in a protocol or indicated by the radio access device to the terminal by using radio resource control (RRC) signaling or signaling at other layers (e.g., physical layer signaling or MAC layer signaling).

For example, if the protocol specifies or the radio access device sets that the remaining resources can be used to transmit remaining data (e.g., URLLC data and/or MBB data) in a buffer of the terminal, the terminal may transmit the MBB data by using the remaining resources. Certainly, if the resource in the shared resource 1 is insufficient when the terminal transmits the data by using the shared resource 1, the terminal preferentially transmits the data by using the remaining resources.

Alternatively, if the protocol specifies or the radio access device sets that the remaining resources are merely used to transmit remaining URLLC data in the buffer of the terminal, the terminal may use the remaining resources to transmit the URLLC data, but not to transmit the MBB data.

Alternatively, if the protocol specifies or the radio access device sets that the remaining resources cannot be used to transmit any data, and if the terminal needs to transmit data, the terminal needs to wait for a next available resource (e.g., a shared resource or a scheduling resource) to transmit the data. It should be noted that the URLLC data (with a higher priority) and the MBB data (the MBB data has a lower priority than the URLLC data) are used as an example in the foregoing description, a person skilled in the art can understand that this is applicable to bearers with different priorities, a bearer with a higher priority is processed in a same manner as the URLLC data, and a bearer with a lower priority is processed in a same manner as the MBB data.

Figure 7:
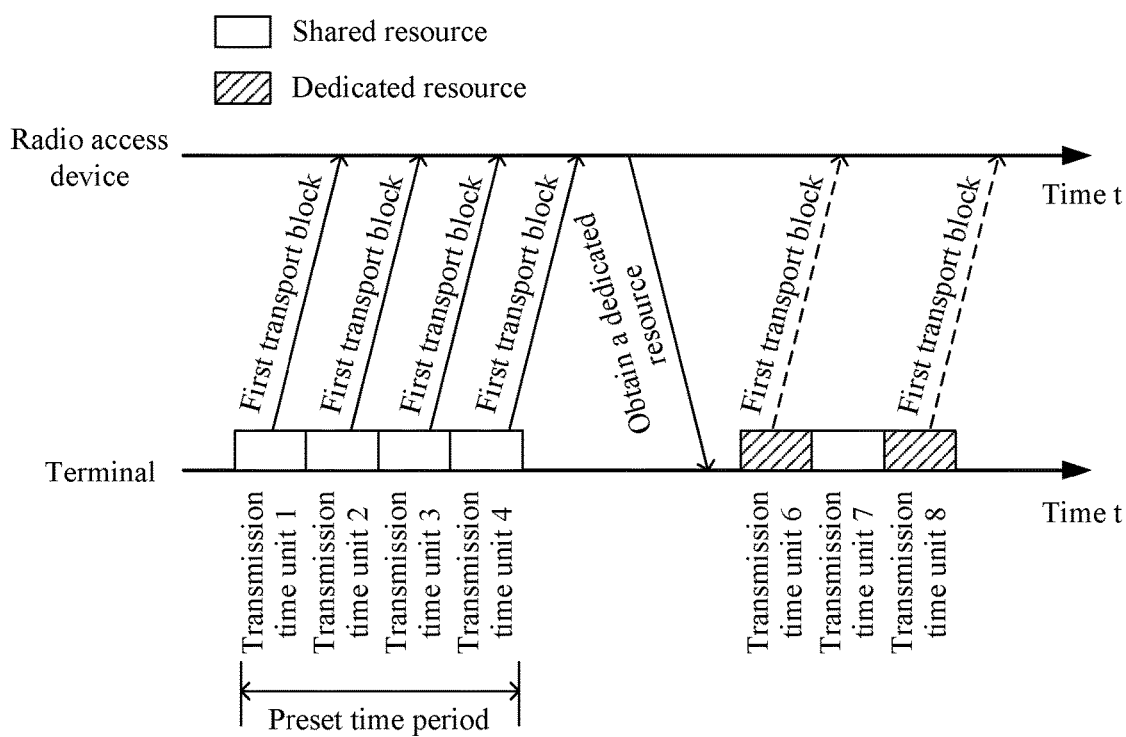
FIG. 7 is a schematic diagram 6 of an application scenario of a data transmission method according to an embodiment of the present application.

In addition, in a process in which the terminal sends the first transport block to the radio access device by using the shared resource, the terminal may further set a preset time period. In this case, as shown in FIG. 7, within the preset time period, the terminal may send the first transport block to the radio access device for the X times one by one by using the shared resource. When the preset time period elapses, the terminal may clear a related buffer for sending the first transport block, and stop sending the first transport block to the radio access device by using the shared resource.

This is because if there is a relatively large quantity of terminals that need to send transport blocks to the radio access device, there may be a latency before the radio access device feeds back, to the terminal, the dedicated resource allocated to the terminal. However, the radio access device has actually allocated, to the terminal, the dedicated resource that is used for sending the first transport block. In this case, if the terminal still continues to transmit the first transport block by using the shared resource, another terminal cannot preempt a corresponding shared resource to send data. Therefore, the preset time period is set, so that the terminal may transmit the first transport block only within the preset time period by using the shared resource. Once the preset time period elapses, the terminal no longer transmits the first transport block by using the shared resource, but waits for the dedicated resource allocated by the radio access device to the terminal and transmits the first transport block by using the dedicated resource.

For example, after receiving to-be-sent data from an application layer, the terminal may start a timer (e.g., Discard Timer), send the resource allocation request to the radio access device within a timing period of the timer, and send the first transport block to the radio access device by using the shared resource. When the timer expires, the terminal neither sends the resource allocation request to the radio access device, nor sends the first transport block to the radio access device by using the shared resource, and waits for the dedicated resource allocated by the radio access device to the terminal and transmit the first transport block by using the dedicated resource.

For example, a specific timing time of the timer may be set by using a granularity of a symbol length of a specific numerology, in terms of Ts, or a specific time unit newly introduced into an NR. The granularity may be less than a TTI of the URLLC data.

The preset time period may be predefined in the protocol, may be sent by the radio access device to the terminal by using dedicated signaling, or may be notified by the radio access device to the terminal by using a broadcast message. Alternatively, the radio access device may add a plurality of preset time periods with different time lengths to a broadcast message. In this way, each terminal may determine, from the plurality of preset time periods based on a service type or a priority of a transport block transmitted by the terminal, a preset time period used by the terminal. This is not limited in this embodiment of the present application.

It should be noted that a sequential relationship between the foregoing step 101 and step 102 is not limited in this embodiment of the present application. The terminal may first perform step 101, and then perform step 102; may first perform step 102, and then perform step 101; or may simultaneously perform steps 101 and 102. This is not limited in this embodiment of the present application.

103. The terminal receives resource allocation information sent by the radio access device, where the resource allocation information is used to indicate the dedicated resource used for transmitting the first transport block by the terminal.

Specifically, still as shown in FIG. 5A, after allocating, to the terminal, the dedicated resource to be used by the terminal, the radio access device sends the resource allocation information to the terminal. The resource allocation information may specifically include parameters, such as location information and a modulation scheme of the dedicated resource. In this way, after receiving the resource allocation information sent by the radio access device, the terminal may determine, based on the resource allocation information, one or more transmission time units within which the dedicated resource is distributed. As shown in FIG. 5A, the dedicated resource is within a transmission time unit 6 and a transmission time unit 8. Subsequently, the terminal may send the first transport block by using the corresponding dedicated resource within the transmission time unit 6 and the transmission time unit 8.

It should be noted that the dedicated resource configured by the radio access device for the terminal may allow the terminal to send the first transport block only once or send the first transport block for a plurality of times.

If the terminal is allowed to send the first transport block for the plurality of times, the dedicated resource used for sending the first transport block by the terminal each time is located within a different transmission time unit, and the radio access device may add, to the resource allocation information, information about all transmission time units within which the dedicated resource is located, and inform the information to the terminal. For example, the dedicated resource is located within the transmission time unit 3 and the transmission time unit 4. Subsequently, the terminal directly sends the first transport block to the radio access device twice by using the dedicated resource within the transmission time unit 3 and the transmission time unit 4.

Alternatively, if the terminal is allowed to send the first transport block for the plurality of times, a preset sending policy may be configured in the terminal in advance. For example, the sending policy may be: separately sending the first transport block within four consecutive transmission time units or sending the first transport block for three times at an interval of one transmission time unit. In this case, the resource allocation information includes information about a transmission time unit within which the terminal sends the first transport block on the dedicated resource for the first time. Subsequently, the terminal may determine, based on the resource allocation information and the sending policy, a specific resource location at which the first transport block is sent each time.

In addition, if the terminal does not perform step 101, that is, the terminal does not send the resource allocation request to the radio access device, and if the radio access device can determine, based on the first transport block sent by the terminal to the radio access device by using the shared resource, that the terminal needs to send data to the radio access device, or if the radio access device can determine, in another manner, that the terminal needs to send data to the radio access device, the radio access device may be triggered to allocate the dedicated resource to the terminal, and indicate the allocated dedicated resource to the terminal by using the resource allocation information.

104. The terminal sends the first transport block to the radio access device for Y (Y≥0) times by using a target resource, where the target resource includes the dedicated resource.

Certainly, as shown in FIG. 5A, the target resource may further include the shared resource.

In other words, after obtaining the dedicated resource allocated by the radio access device to the terminal, the terminal may continue sending the first transport block by using only the dedicated resource, or may send the first transport block by using both the dedicated resource and the shared resource. This is not limited in this embodiment of the present application.

It should be noted that because before sending the first transport block to the radio access device for the Y times by using the target resource, the terminal has sent the first transport block to the radio access device for the X times by using the shared resource, before the terminal performs step 104, the radio access device may possibly have correctly received the first transport block, and sends an acknowledgment response to the first transport block to the terminal. In this case, the terminal does not need to send the first transport block to the radio access device. That is, Y=0 in step 104.

In addition, when the terminal sends the first transport block to the radio access device for the Y times by using the target resource, for example, when the terminal sends the first transport block within the transmission time unit 6 by using a target resource within the transmission time unit 6, if the transmission time unit 6 includes both a dedicated resource and a shared resource, the terminal may preferentially send the first transport block by using the dedicated resource within the transmission time unit 6 because the dedicated resource does not collide with a resource used by another terminal.

Further, each time receiving the first transport block sent by the terminal, the radio access device may combine the first transport block with a previously received first transport block, and attempt to decode the combined first transport block. When correctly decoding the first transport block, that is, successfully receiving the first transport block, the radio wireless device may send the acknowledgment response to the first transport block to the terminal. Then, if receiving the acknowledgment response to the first transport block, the terminal may stop sending the first transport block to the radio access device.

Optionally, after receiving the acknowledgment response to the first transport block, the terminal may clear the first transport block in a buffer.

Alternatively, a timer may be set in the terminal. A time set for the timer is a latency indicator for transmitting the first transport block. In this case, when the terminal sends the first transport block for the first time, the terminal may be triggered to start the timer. When the timer expires, it indicates that a time for sending the first transport block by the terminal exceeds the latency indicator preset for the terminal. In this case, regardless whether the radio access device successfully receives the first transport block, the terminal may stop sending the first transport block to the radio access device. Optionally, the terminal may clear the first transport block in a buffer.

Alternatively, the terminal may calculate, based on a success probability of each transmission process, a quantity N (N>0) of times required for transmitting the first transport block. For example, it is assumed that a reliability requirement of the URLLC data in a transmission process is 99.999%, and a success probability of each transmission process is 90%. In this case, when the terminal transmits the first transport block twice, the success probability may reach up to 99%; when the terminal transmits the first transport block for three times, the success probability may reach up to 99.9%; . . . ; when the terminal transmits the first transport block for five times, the success probability may reach up to 99.999%, thereby meeting the reliability requirement of 99.999%. Then, regardless of using the shared resource and/or the dedicated resource by the terminal, the terminal may stop sending the first transport block to the radio access device provided that the terminal sends the first transport block to the radio access device for five times. Optionally, the terminal may clear the first transport block in a buffer.

Certainly, the success probability of each transmission process may be different. It is assumed that a success probability of the first transmission process is p1, a success probability of the second transmission process is p2, . . . , and a success probability of the Nth transmission process is pN. In this case, according to a formula: $(1-p1)(1-p2) \ldots (1-pN)<$ a preset failure probability, a specific value of N, namely, the quantity of tines required for transmitting the first transport block, may be determined.

In other words, when a sum of the X times of sending the first transport block in step 102 and the Y times of sending the first transport block in step 104 is greater than or equal to N, the terminal may stop sending the first transport block to the radio access device. In this case, if the X times of sending the first transport block in step 102 is equal to N, the terminal does not need to send the first transport block to the radio access device by using the target resource, that is, Y=0 in step 104.

In addition, the terminal may further report the calculated quantity N of transmission times to the radio access device. The terminal may determine the quantity of transmission times by using the foregoing method, but determining the quantity of transmission times is not limited to the foregoing method. Other methods may alternatively include configuring the quantity of transmission times by an application layer of the terminal. The application layer of the terminal may be operated by a user of the terminal. In addition, the terminal may report the quantity of transmission times to the radio access device by using indications from a layer, for example, an RRC message, a MAC layer message, an RLC layer message, a PDCP layer message, a service data adaptation protocol (SDAP) layer message, or a physical layer message. In this way, after receiving the first transport block for N times, the radio access device may no longer listen to check whether the terminal transmits the first transport block, thereby reducing overheads of the radio access device.

Figure 8A:
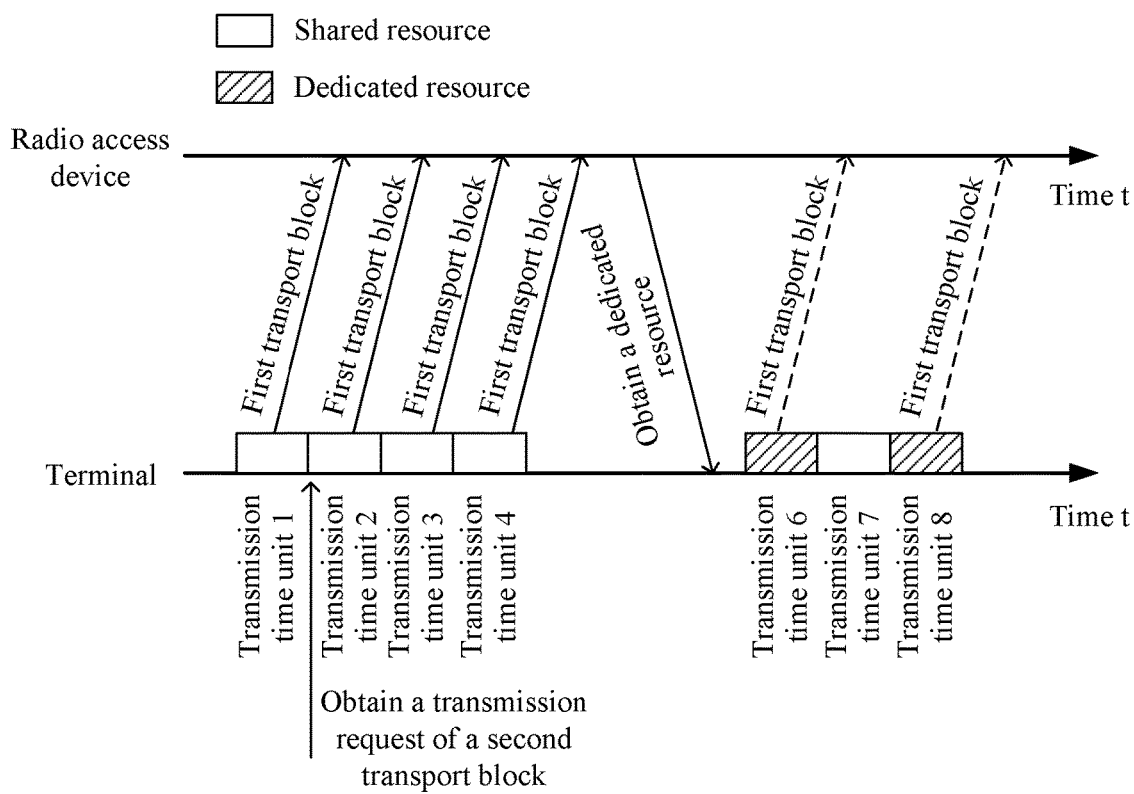
FIG. 8A is a schematic diagram 7 of an application scenario of a data transmission method according to an embodiment of the present application.

An example in which the terminal transmits the first transport block is used for description in the foregoing. In an actual transmission process, the terminal may need to transmit a plurality of transport blocks. As shown in FIG. 8A, in a process in which the terminal transmits the first transport block by using the shared resource, for example, the terminal transmits the first transport block by using a shared resource within the transmission time unit 1, if the terminal obtains a transmission request of a second transport block within the transmission time unit 2, the terminal may continue to transmit the first transport block by using a shared resource within the transmission time unit 2, instead of transmitting the second transport block by using the shared resource within the transmission time unit 2. This can ensure that the transmission of the second transport block does not cause an increased transmission latency of the first transport block that has been started to be transmitted.

In another application scenario, after the terminal obtains the dedicated resource configured by the radio access device, if the terminal obtains a new transport block, for example, the transmission request of the second transport block, the terminal may alternatively determine, based on a size of a transport block that can be transmitted on the dedicated resource and a size of a transport block that is previously transmitted on the shared resource, whether to transmit the second transport block.

Figure 8B:
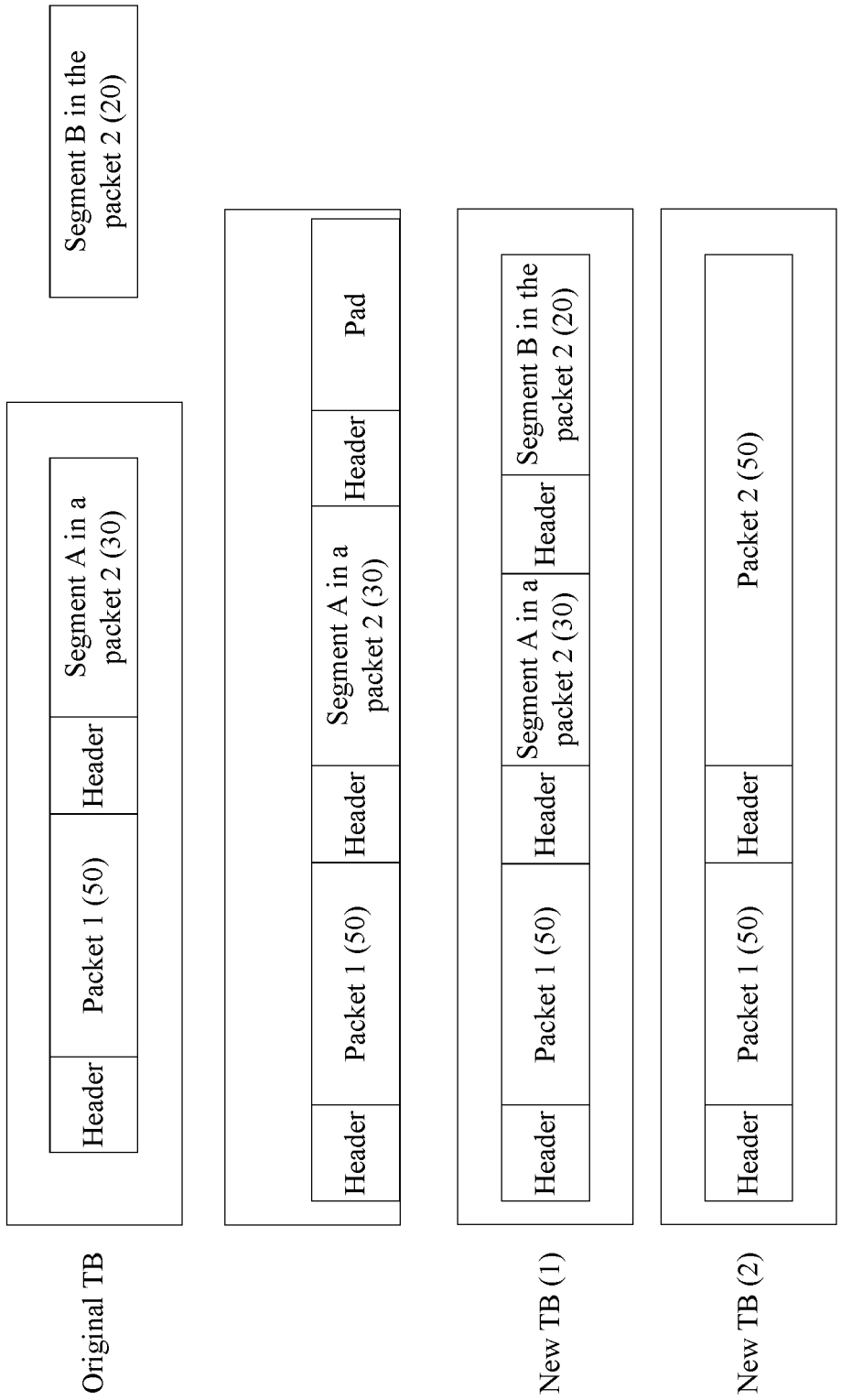
FIG. 8B is a schematic diagram 8 of an application scenario of a data transmission method according to an embodiment of the present application.

For example, when the size of the transport block that can be transmitted on the dedicated resource is greater than the size of the transport block that is previously transmitted on the shared resource, the terminal may also transmit a part of the second transport block on the dedicated resource in addition to the original first transport block. In this case, the terminal may transmit two transport blocks or only one transport block on the dedicated resource. In this case, after the radio access device receives data on the dedicated resource, an RLC layer of the radio access device can determine a transport block that has not been transmitted completely. Therefore, the radio access device may continue to configure a dedicated resource for the terminal. As shown in FIG. 8B, in a first case, a TB is able to accommodate data of a packet 1 and data of a segment A in a packet 2, but is not able to accommodate data of a segment B in the packet 2, when a shared transmission resource is used. In a second case, a dedicated resource scheduled by the radio access device can be used for a TB. The dedicated resource allocated for the TB is sufficient to accommodate a packet 1 and a packet 2. However, the TB accommodates the packet 1 and a segment A in the packet 2 but excludes a segment B of the packet 2. A remaining resource is filled with padding (pad) data (e.g., a group of numbers being 0). In a third case, a dedicated resource scheduled by the radio access device can be used for a TB. The dedicated resource allocated for the TB is sufficient to accommodate a packet 1 and a packet 2, and the TB accommodates the packet 1 and the packet 2. A segment A and a segment B in the packet 2 are segmented and accommodated in the TB. In a fourth case, a dedicated resource scheduled by the radio access device can be used for a TB. The dedicated resource allocated for the TB is sufficient to accommodate a packet 1 and a packet 2. A segment A in the packet 2 and a segment B in the packet 2 are combined into one packet 2 to be accommodated in the TB.

For another example, when the size of the transport block that can be transmitted on the dedicated resource is equal to the size of the transport block that is previously transmitted on the shared resource, the terminal may transmit only one complete first transport block on the dedicated resource. In this case, the radio access device also cannot learn the transmission requirement of the second transport block. Then, the second transport block may be transmitted based on the foregoing transmission method by using the shared resource. In this case, the terminal is allocated an uplink transmission resource. Adding the data to the TB (which is also referred to as logical channel prioritization procedure) is considered as retransmission, and content of a MAC element is not added to the retransmitted transport block.

For another example, when the size of the transport block that can be transmitted on the dedicated resource is less than the size of the transport block that is previously transmitted on the shared resource, the terminal may transmit only a part of the first transport block on the dedicated resource. In this case, after receiving data on the dedicated resource, the radio access device may determine a transport block that has not been completely transmitted. Therefore, the radio access device may continue to configure a dedicated resource for the terminal. In this case, the second transport block and a remaining segment of the first transport block may be transmitted together on the dedicated resource configured by the radio access device subsequently.

Figure 8C:
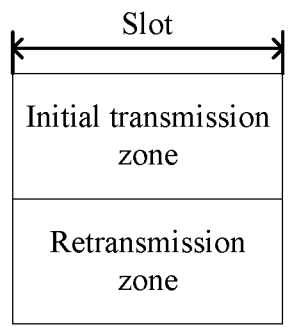
FIG. 8C is a schematic diagram 9 of an application scenario of a data transmission method according to an embodiment of the present application.

In another application scenario, as shown in FIG. 8C, a shared resource (or a dedicated resource) at a same moment may be divided into an initial transmission zone or a retransmission zone. In this case, if both a to-be-initially-transmitted transport block and a to-be-retransmitted transport block need to be sent at a same time, the terminal may transmit the to-be-retransmitted transport block (e.g., the first transport block) in the retransmission zone, and transmit the to-be-initially-transmitted transport block (e.g., the second transport block) in the initial transmission zone.

The division into the initial transmission zone and the retransmission zone may be configured for the terminal in a static or semi-static manner. In the static manner, when the terminal accesses a network, the radio access device notifies the terminal of specific locations of the initial transmission zone and the retransmission zone by using higher layer signaling/physical layer signaling. In the semi-static manner, the radio access device may adjust sizes of the initial transmission zone and the retransmission zone based on a service type, and notify the terminal of specific locations of the initial transmission zone and the retransmission zone by using higher layer signaling/physical layer signaling. This is not limited in this embodiment of the present application.

Further, the radio access device cannot determine a transport block received each time is which transport block sent by the terminal for which time. Therefore, when sending different transport blocks, the terminal may interact with the radio access device by using different HARQ processes. Each transport block corresponds to one HARQ process. In this way, the radio access device may use received transport blocks with a same HARQ process ID as a same transport block, for example, the first transport block. Subsequently, the radio access device merges and decodes data of the transport blocks with the same HARQ process ID, to correctly receive the first transport block.

In this case, in step 102, when sending the first transport block to the radio access device for the X times by using the shared resource, the terminal may randomly determine a HARQ process ID, or the terminal may determine a HARQ process ID based on a location of a transmission time unit within which the shared resource is located, and then send the first transport block on the shared resource by using the HARQ process ID.

For example, correspondences between different subframes and HARQ process IDs may be preset. In this case, after determining a subframe in which the shared resource for transmitting the first transport block last time is located, the terminal may determine, based on the correspondences, a HARQ process ID used during current transmission of the first transport block, to retransmit the first transport block. The HARQ process IDs used for last transmission and current transmission are the same.

However, in step 103, the resource allocation information received by the terminal from the radio access device may carry a HARQ process ID. If the HARQ process ID is the same as the HARQ process ID used by the terminal to send the first transport block on the shared resource, the terminal may continue to send the first transport block on the dedicated resource by using the HARQ process ID. If the HARQ process ID is different from the HARQ process ID used by the terminal to send the first transport block on the shared resource, for example, the HARQ process ID carried in the resource allocation information is 2 and the HARQ process ID used by the terminal to send the first transport block on the shared resource is 3, the terminal may copy content corresponding to a No. 3 HARQ process into a No. 2 HARQ process, and then send the first transport block on the dedicated resource by using the No. 2 HARQ process.

Certainly, the resource allocation information does not carry a HARQ process ID. In this case, the terminal may send the first transport block by still using the HARQ process ID used for sending the first transport block on the shared resource.

Further, each time before sending the first transport block to the radio access device by using the shared resource, the terminal may insert first indication information into the to-be-sent first transport block. The first indication information includes a HARQ process ID and a new data indicator (NDI) that are used by the terminal to transmit the first transport block this time. The HARQ process ID is used to indicate a specific HARQ process used by the terminal to transmit the first transport block, and the NDI is used to indicate whether the first transport block transmitted by the terminal is new data or retransmitted data.

Figure 9:
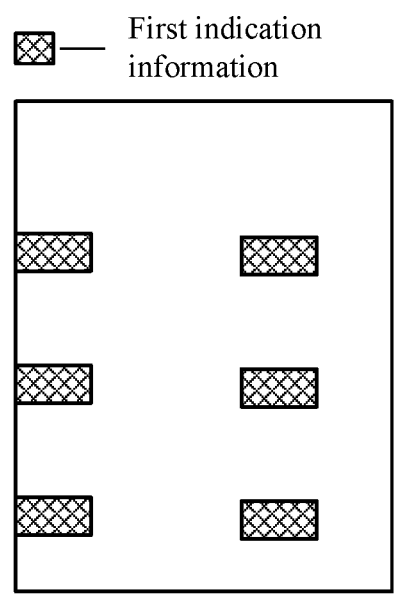
FIG. 9 is a schematic diagram 10 of an application scenario of a data transmission method according to an embodiment of the present application.

For example, after determining to transmit the first transport block by using the shared resource, a media access control (MAC) entity of the terminal may further determine whether the first transport block to be transmitted this time is the new data or the to-be-retransmitted data for repeated transmission and further determine which HARQ process ID is used for transmitting the first transport block. Then, the MAC entity of the terminal sends the information to a physical layer of the terminal. As shown in FIG. 9, the physical layer entity maps the first transport block to a physical resource corresponding to the shared resource, selects some resource locations for puncturing, and inserts the HARQ process ID and the NDI into the punctured locations, that is, inserts the first indication information.

After receiving the transport block carrying the first indication information, the radio access device may determine, according to the first indication information inserted into the punctured locations, whether the first transport block is the new data or the retransmitted data. If the first transport block is the retransmitted data, the radio access device may send the first transport block to a HARQ process corresponding to the HARQ process ID for data merging. If the first transport block is the new data, the radio access device may temporarily store the first transport block in a buffer corresponding to the HARQ process ID of the first transport block, and wait for the first transport block to be subsequently retransmitted, to perform data merging.

In addition, the first indication information may further carry redundancy version information. The redundancy version information is used to indicate a redundancy version used for restoring punctured data. Certainly, the redundancy version information may alternatively be preset in the radio access device. In this case, the first indication information does not need to carry the redundancy version information, and the radio access device may directly restore punctured data based on the preset redundancy version information after receiving the first indication information.

Certainly, the terminal may alternatively notify the radio access device of the first indication information by using uplink control signaling through an uplink control channel, or notify the radio access device of the first indication information by using an implicit method such as a cyclic shift of a DMRS or a CRC mask. This is not limited in this embodiment of the present application.

Optionally, in this embodiment of the present application, when allocating the shared resource to the terminal, the radio access device may allocate different shared resources in different cells to a same terminal. For example, the terminal 1 belongs to both the cell 1 and a cell 2, and the radio access device serves both the cell 1 and the cell 2; then, the radio access device allocates the shared resource 1 to the terminal 1 to the terminal 3 in the cell 1 and allocates the shared resource 2 to a terminal 1 and a terminal 4 in the cell 2. In this case, the terminal 1 has two shared resources: the shared resource 1 corresponding to the cell 1 and the shared resource 2 corresponding to cell 2.

Figure 10:
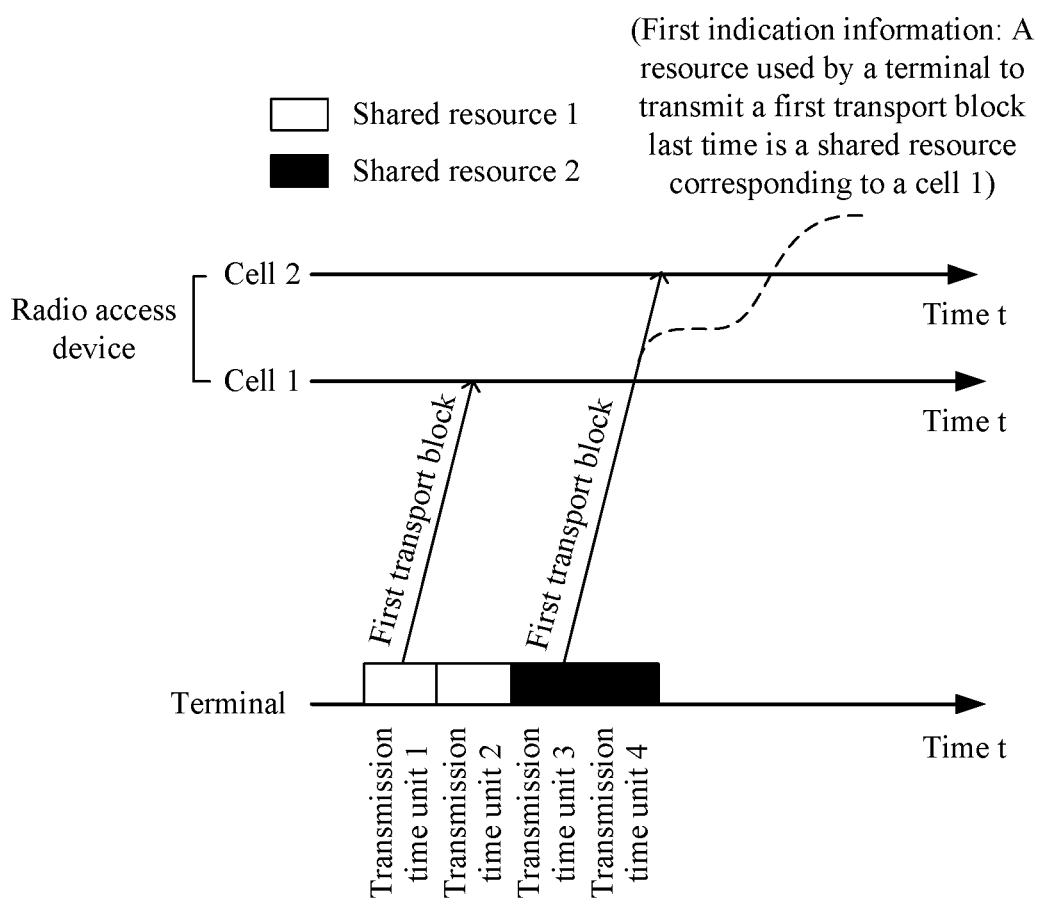
FIG. 10 is a schematic diagram 11 of an application scenario of a data transmission method according to an embodiment of the present application.

Then, still using the first transport block as an example, as shown in FIG. 10, after the terminal sends the first transport block for the first time by using the shared resource 1 corresponding to the cell 1, if the terminal has no shared resource in the cell 1 within a short time, or the terminal does not obtain the dedicated resource allocated by the radio access device, the terminal may repeatedly send the first transport block by using the shared resource 2 corresponding to the cell 2.

In this case, the first indication information further carries an identity of a cell in which the terminal transmits the first transport block most recently. As shown in FIG. 10, the first indication information in this case further carries an identity of the cell 1. The identity of the cell 1 is used to inform the radio access device that a resource used by the terminal to transmit the first transport block last time is the shared resource corresponding to the cell 1.

In this way, after receiving the first indication information, the radio access device may merge data of the first transport block received this time by using the shared resource 2 corresponding to the cell 2 and the first transport block received by using the shared resource 1 corresponding to the cell 1.

Optionally, a dedicated cell identity of a cell corresponding to the terminal may be configured for the terminal. For example, the terminal 1 corresponds to the cell 1 and the cell 2. In this case, for the terminal 1, a dedicated cell identity of the cell 1 may be configured to be 0, and a dedicated cell identity of the cell 2 may be configured to be 1. In this case, the dedicated cell identity may be used to replace the identity of the cell in the first indication information. In this way, a length of the dedicated cell identity is far less than a length of the identity of the cell, thereby further reducing air interface resources during transport block transmission.

Alternatively, a set of HARQ processes may be set on the terminal and are specially used to transmit data on the shared resource. Regardless of which cell, the set of HARQ processes are used to transmit data on the shared resource. In an application scenario shown in FIG. 10, the terminal sends the first transport block in the cell 1 and the cell 2 by using the same set of HARQ processes. Therefore, the first indication information sent by the terminal does not need to carry the identity of the cell 1, and merely needs to carry a HARQ process ID used for sending the first transport block in the cell 1.

In the foregoing embodiment, the terminal indicates, to the radio access device in a puncturing manner, a HARQ process ID used for transmitting the first transport block each time.

In another possible design manner, although the radio access device does not know a HARQ process ID used when the terminal sends the first transport block by using the shared resource, the radio access device may add second indication information to the resource allocation information sent to the terminal. The second indication information is used to instruct the terminal to repeatedly send the first transport block transmitted within a transmission time unit K (K≥0), and the transmission time unit K is a transmission time unit prior to a transmission time unit within which the resource allocation information is received.

In this way, after receiving the resource allocation information, the terminal can send, according to the carried second indication information and on the dedicated resource allocated by the radio access device, the first transport block by using a HARQ process ID used when the first transport block is sent within the transmission time unit K. In other words, the radio access device can implicitly indicate, to the terminal by using the second indication information, the HARQ process ID used for sending the first transport block.

Figure 11:
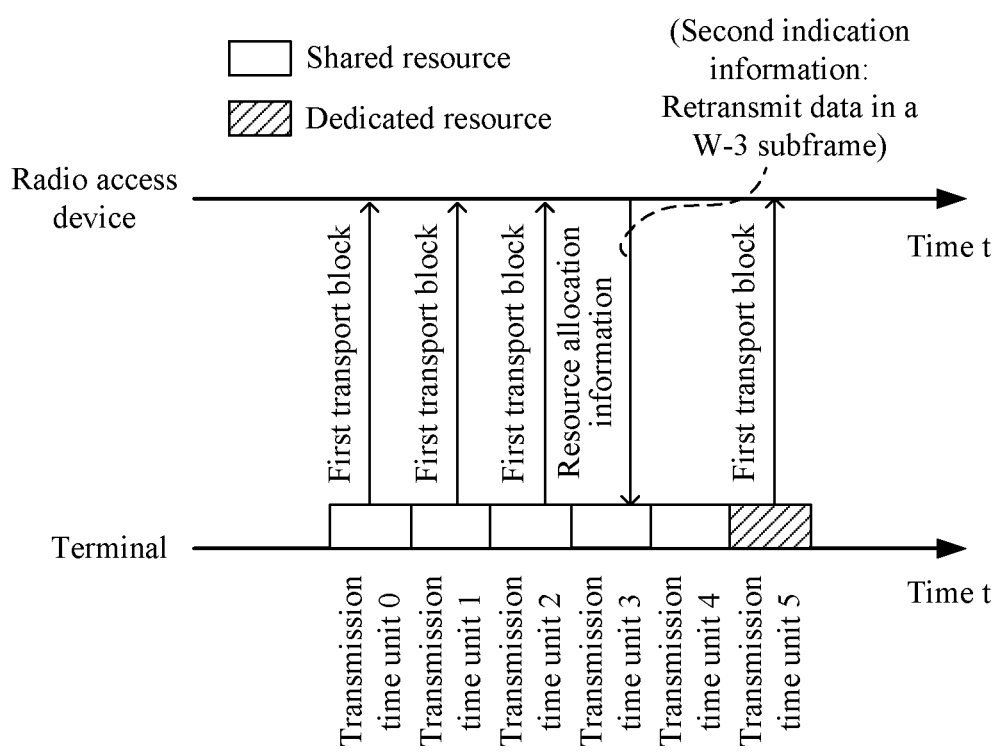
FIG. 11 is a schematic diagram 12 of an application scenario of a data transmission method according to an embodiment of the present application.

For example, as shown in FIG. 11, after sending the resource allocation request to the radio access device, the terminal sends the first transport block for three times by using the shared resource. When the terminal receives the resource allocation information sent by the radio access device, the resource allocation information includes the second indication information in addition to related information such as a location of the dedicated resource allocated to the terminal. For example, the second indication information instructs to retransmit data within a W-3 transmission time unit. In this case, the transmission time unit K is the W-3 transmission time unit. In other words, the radio access device instructs the terminal to retransmit data that has been sent within a transmission time unit 0, namely, a transmission time unit shifted forward by three transmission time units from a current transmission time unit (namely, a transmission time unit 3) within which the resource allocation information is received.

After receiving the second indication information, the terminal can send, on the dedicated resource allocated by the radio access device, the first transport block by using a HARQ process ID used when the first transport block is sent within the transmission time unit 0.

In addition, the transmission time unit K may alternatively be determined based on a transmission time unit within which the dedicated resource allocated by the radio access device is located, namely, a transmission time unit 5 in FIG. 11. In this case, as shown in FIG. 11, the transmission time unit K, namely, the W-3 transmission time unit, is a transmission time unit 2 shifted forward by three transmission time units from the transmission time unit 5 within which the dedicated resource is located.

Certainly, if the radio access device has parsed out, when allocating the dedicated resource to the terminal, the HARQ process ID used when the terminal sends the first transport block previously by using the shared resource, the parsed HARQ process ID may be directly added to the second indication information. This is not limited in this embodiment of the present application.

Alternatively, if the correspondences between different subframes and HARQ process IDs are preset, when the radio access device receives the first transport block transmitted by the terminal, the radio access device may determine, based on a subframe in which the first transport block is located, a HARQ process ID used by the terminal. For example, the HARQ process ID is 3. In this case, the radio access device may directly instruct, in the second indication information, the terminal to transmit the first transport block on the dedicated resource by using a HARQ process whose HARQ process ID is 3.

In addition, the radio access device may alternatively send an ACK/NACK through a PHICH channel, to notify the terminal whether the transport block received on the shared resource is correctly received. If the radio access device has correctly received the transport block, the radio access device sends an ACK to the terminal; otherwise, the radio access device sends a NACK to the terminal. In this case, if the terminal receives the NACK, the terminal may retransmit the first transport block in a subframe shifted backward by a specific quantity of subframes from a subframe in which the NACK is located.

Alternatively, a fixed time interval such as 30 ms may be agreed according to a protocol or preconfigured by using RRC signaling. In this case, the radio access device starts timing after receiving, on the shared resource, the first transport block transmitted by the terminal. If data in the first transport block cannot be correctly parsed out within 30 ms, the radio access device sends the resource allocation information shown in FIG. 11 to the terminal. In this way, the terminal may determine, by shifting forward for 30 ms, a HARQ process ID used when the first transport block is sent before 30 ms, and then retransmit the first transport block by using the same HARQ process ID after receiving the resource allocation information for 30 ms.

Further, if a plurality of shared resources are allocated to the terminal on different frequency sub-bands in one subframe (as shown in FIG. 6), the second indication information may instruct to retransmit data on a No. M frequency sub-band within the W-3 transmission time unit. In this way, after receiving the second indication information, the terminal determines a HARQ process ID that is used for sending data on the No. M frequency sub-band within the W-3 transmission time unit by the terminal, to determine to continue to retransmit the first transport block by using the HARQ process ID.

Figure 12:
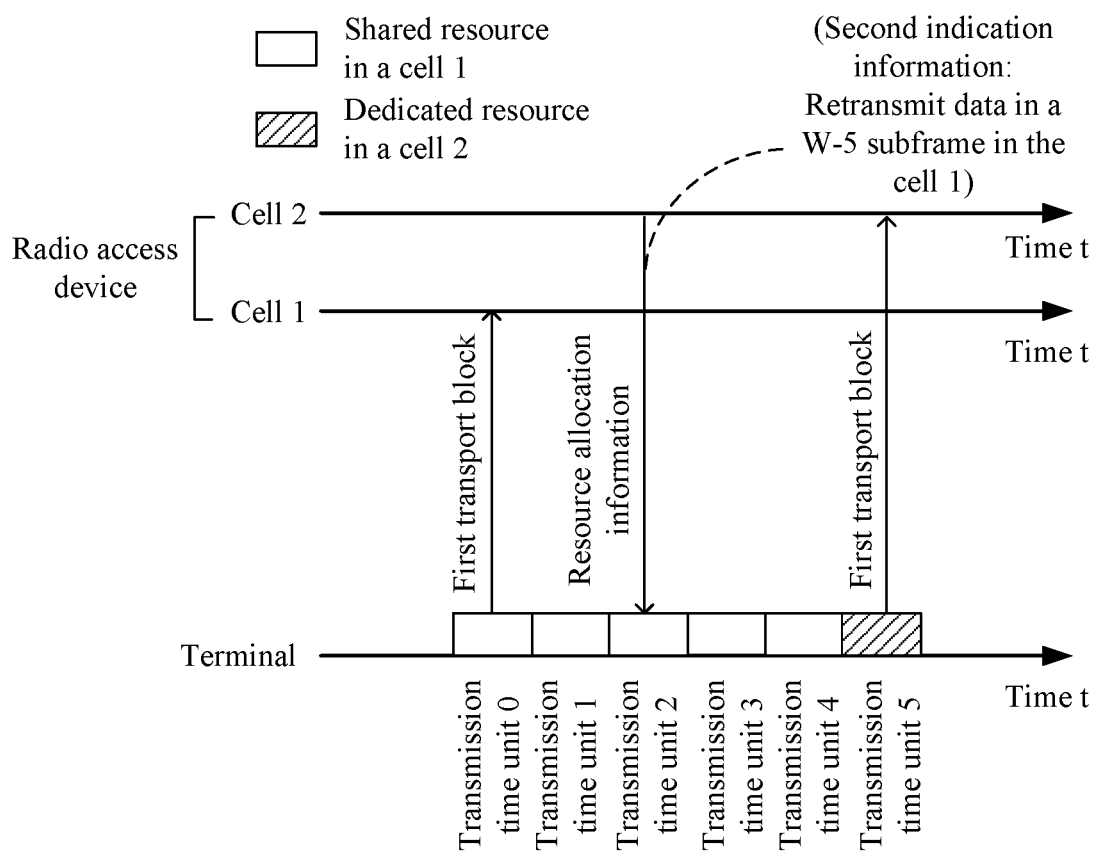
FIG. 12 is a schematic diagram 13 of an application scenario of a data transmission method according to an embodiment of the present application.

In addition, when the radio access device allocates shared resources in different cells to the terminal, as shown in FIG. 12, a shared resource corresponding to the cell 1 is set within the transmission time unit 0, and the terminal sends the first transport block within the transmission time unit 0 for the first time. If the radio access device determines that there is no available dedicated resource in the cell 1, and there is an available dedicated resource in the cell 2 (namely, the dedicated resource within the transmission time unit 5), the radio access device may allocate the dedicated resource in the cell 2 to the terminal. In this case, the second indication information carried in the resource allocation information further includes an identity of a cell in which the terminal transmits the first transport block within the transmission time unit K. For example, the second indication information in this case may instruct to retransmit data within a W-5 transmission time unit in the cell 1. The W-5 transmission time unit is the transmission time unit 0, namely, a transmission time unit shifted forward by five transmission time units from the transmission time unit 5 within which the dedicated resource is located.

In other words, the dedicated resource allocated by the radio access device to the terminal in this case is located in the cell 2, and data that the radio access device requires the terminal to retransmit is the first transport block that has been transmitted within the W-5 transmission time unit in the cell 1.

Similar to FIG. 11, correspondences between different subframes and HARQ process IDs are preset. The correspondences may be correspondences between subframes of a cell and a group of HARQ process IDs of the terminal, or may be correspondences between subframes of a plurality of cells and a group of HARQ process IDs of the terminal. In this case, when receiving the first transport block transmitted by the terminal, the radio access device may determine, based on a subframe in which the first transport block is located, a HARQ process ID used by the terminal. For example, the HARQ process ID is 3. In this case, the radio access device may directly instruct, in the second indication information, the terminal to transmit the first transport block on the dedicated resource of the cell 2 by using a HARQ process whose HARQ process ID is 3.

Alternatively, a fixed time interval such as 30 ms may be agreed according to a protocol or preconfigured by using RRC signaling. In this case, the radio access device starts timing after receiving, on the shared resource, the first transport block transmitted by the terminal. If data in the first transport block cannot be correctly parsed out within 30 ms, the radio access device sends the resource allocation information shown in FIG. 12 to the terminal. In this way, the terminal may determine, by shifting forward for 30 ms, a HARQ process ID used when the first transport block is sent before 30 ms, and then retransmit the first transport block in the cell 2 by using the same HARQ process ID after receiving the resource allocation information for 30 ms.

Further, if a plurality of shared resources are allocated to the terminal on different frequency sub-bands in one subframe (as shown in FIG. 6), the second indication information may instruct to retransmit data on a No. M frequency sub-band within the W-5 transmission time unit in the cell 1. A transmission time unit may be a TTI of one or more lengths for transmission in the cell 1 by the terminal, may be a TTI of one or more lengths for transmission in the cell 2 by the terminal, or may be a common divisor of TTIs of a plurality of lengths for transmission in the cell 1 and the cell 2 by the terminal.

In this way, after receiving the second indication information, the terminal determines a HARQ process ID that is used for sending data on the No. M frequency sub-band within the W-5 transmission time unit by the terminal, to determine to continue to retransmit the first transport block in the cell 2 by using the HARQ process ID.

Subsequently, after the terminal sends the first transport block on the dedicated resource allocated by the radio access device, the radio access device needs to perform data merging on the first transport block received by using the dedicated resource corresponding to the cell 2 and the first transport block received by using the shared resource corresponding to the cell 1, that is, perform inter-cell data merging.

However, in another possible design method, when the terminal sends the first transport block to the radio access device by using shared resources or dedicated resources of different cells, the radio access device may alternatively perform data merging only on the first transport block received in a same cell. This can avoid inter-cell data merging with relatively high complexity and reduce data merging complexity.

Figure 13:
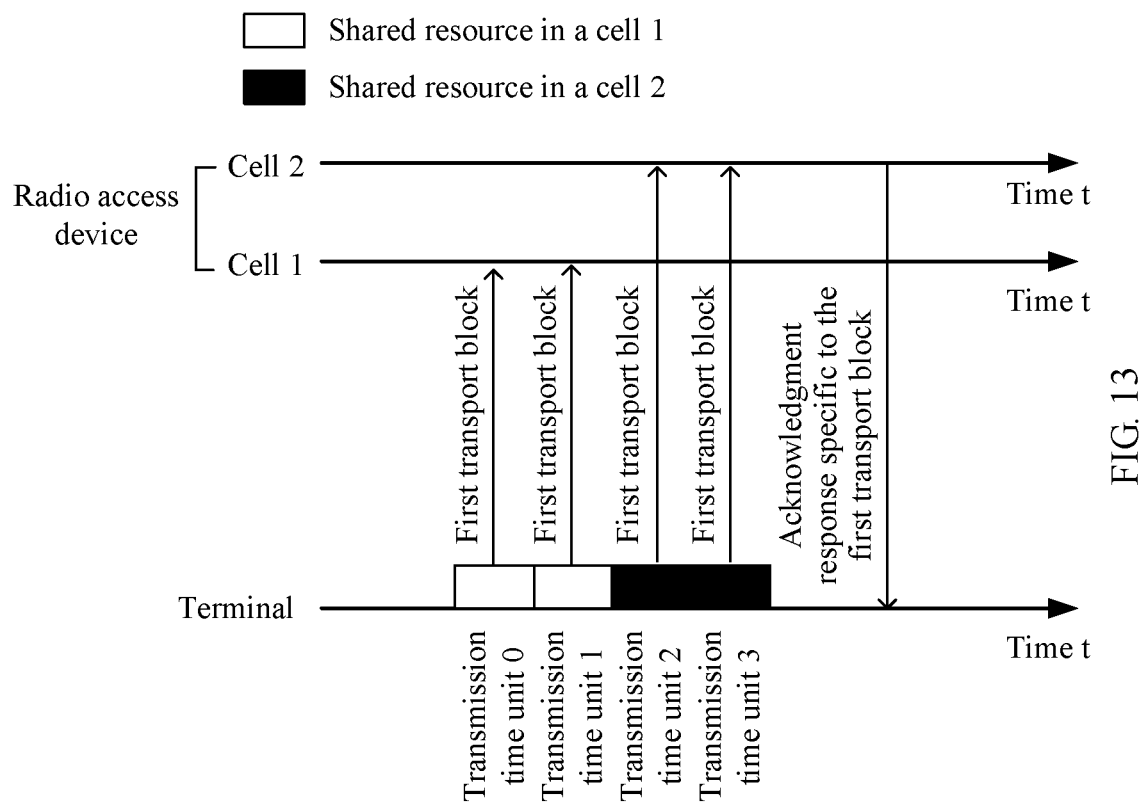
FIG. 13 is a schematic diagram 14 of an application scenario of a data transmission method according to an embodiment of the present application.

As shown in FIG. 13, shared resources within the transmission time unit 0 and the transmission time unit 1 are allocated in the cell 1 by the radio access device to the terminal, and shared resources within the transmission time unit 2 and the transmission time unit 3 are allocated in the cell 2 by the radio access device to the terminal. The terminal sends the first transport block to the radio access device within the transmission time unit 0 and the transmission time unit 1 by using a No. 3 HARQ process ID in the cell 1. Subsequently, the terminal sends the first transport block to the radio access device within the transmission time unit 2 and the transmission time unit 3 by using a No. 5 HARQ process ID in the cell 2. In this case, the radio access device performs data merging on the two first transport blocks received in the cell 1, and performs data merging on the two first transport blocks received in the cell 2.

Once the radio access device determines that first transport blocks received in a specific cell can be correctly decoded after the first transport blocks are merged, the radio access device sends an acknowledgment response to the first transport block to the terminal. As shown in FIG. 13, the terminal receives an acknowledgment response to the first transport block, which is sent by the radio access device through the cell 2. Because the terminal knows that the first transport block sent by using the No. 3 HARQ process ID in the cell 1 and the first transport block sent by using the No. 5 HARQ process ID in the cell 2 are the same transport block, the terminal stops sending the first transport block by using the No. 3 HARQ process ID in the cell 1. In this way, the terminal can also send a same transport block by using resources in a plurality of cells without performing inter-cell data merging.

In the foregoing embodiment, descriptions are provided by using an example in which the terminal sends the first transport block to the radio access device. In this case, when the radio access device needs to send URLLC data to the terminal, for example, a third transport block, the radio access device may send the third transport block to the terminal on the resources in the different cells by using the same HARQ process ID.

Figure 14:
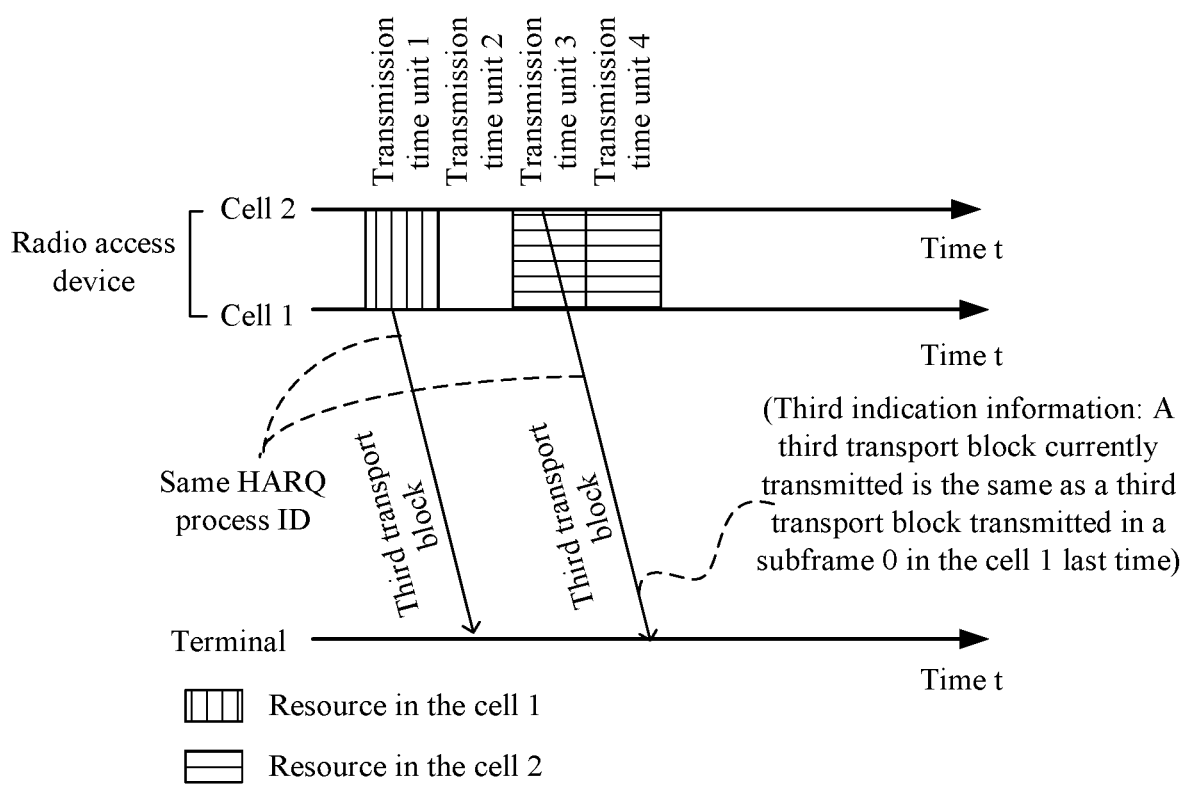
FIG. 14 is a schematic diagram 15 of an application scenario of a data transmission method according to an embodiment of the present application.

As shown in FIG. 14, the radio access device sends the third transport block to the terminal on a resource of the cell 1 within the transmission time unit 1 by using a No. 1 HARQ process ID in the cell 1. If there is no available resource in the cell 1 after the transmission time unit 1, and there is an available resource in the cell 2 within the transmission time unit 3, the radio access device may continue to repeatedly send the third transport block to the terminal on a resource of the cell 2 by still using the No. 1 HARQ process ID in the cell 1. In this case, the radio access device may send third indication information to the terminal through a downlink control channel in the cell 2. The third indication information is used to indicate that the third transport block currently transmitted is the same as the third transport block transmitted within the transmission time unit 1 in the cell 1 last time.

Specifically, in addition to a transmission resource (namely, the transmission time unit 3 in the cell 2 shown in FIG. 14) used for sending the third transport block, the third indication information may include the identity of the cell 1 and the No. 1 HARQ process ID.

In this way, after receiving the third indication information, the terminal may perform data merging and parsing on the third transport block received by using the resource of the cell 1 (namely, the third transport block sent by the radio access device within the transmission time unit 1) and the third transport block received by using the resource of the cell 2 (namely, the third transport block sent by the radio access device within the transmission time unit 3), to correctly receive the third transport block.

Certainly, the radio access device may alternatively send the third indication information to the terminal through a downlink control channel in the cell 1. This is not limited in this embodiment of the present application.

Alternatively, the radio access device may send the third transport block on the resources of the different cells by using different HARQ process IDs. For example, the radio access device sets a No. 1 HARQ process ID to a No. 8 HARQ process ID in the cell 1 and sets a No. 1 HARQ process ID to a No. 8 HARQ process ID in the cell 2. In this case, the No. 1 HARQ process ID in the cell 1 is different from the No. 1 HARQ process ID in the cell 2.

In this case, the third indication information is used to indicate that one of different HARQ process IDs used by the radio access device is an anchor HARQ process ID. After receiving the third indication information, the terminal sends, to a HARQ process indicated by the anchor HARQ process ID, the third transport block received by using another HARQ process ID, and the HARQ process performs data merging on the third transport block received twice.

Figure 15:
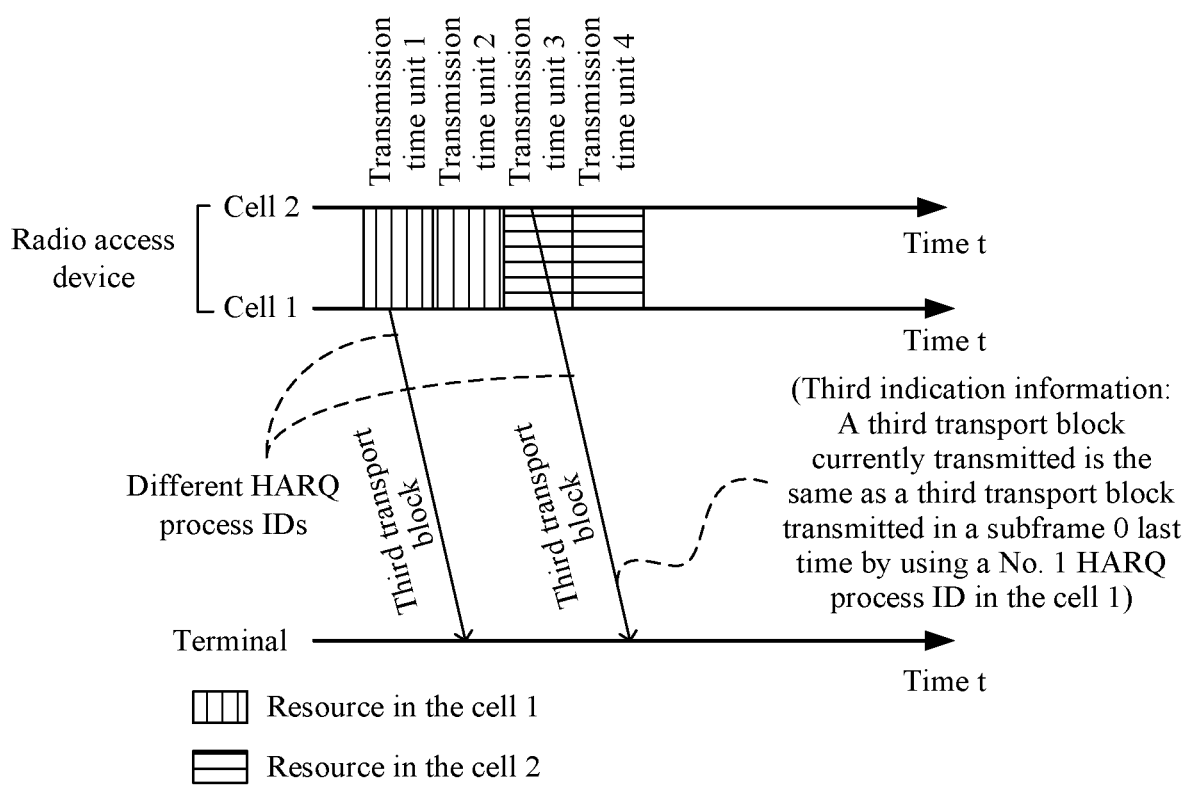
FIG. 15 is a schematic diagram 16 of an application scenario of a data transmission method according to an embodiment of the present application.

As shown in FIG. 15, the radio access device sends the third transport block to the terminal on the resource of the cell 1 within the transmission time unit 1 by using the No. 1 HARQ process ID in the cell 1. Subsequently, the radio access device sends the third transport block on the resource of the cell 2 within the transmission time unit 3 to the terminal by using the No. 1 HARQ process ID in the cell 2. In this case, the third indication information sent by the radio access device to the terminal through the downlink control channel in the cell 2 is used to indicate that the third transport block currently transmitted is the same as the third transport block transmitted within the transmission time unit 1 last time by using the No. 1 HARQ process ID in the cell 1.

It can be learned that a No. 1 HARQ process in the cell 1 is an anchor HARQ process. Specifically, in addition to a transmission resource (namely, the transmission time unit 3 in the cell 2) used for sending the third transport block, the third indication information may include the identity of the cell 1 and the No. 1 HARQ process ID in the cell 1. The terminal may determine, based on the identity of the cell 1 and the No. 1 HARQ process ID in the cell 1, that the No. 1 HARQ process in the cell 1 is the anchor HARQ process.

In the examples in FIG. 14 and FIG. 15, it is assumed that the radio access device first transmits the third transport block in the cell 1, and then transmits the third transport block in the cell 2. Actually, the two transmission processes may be performed simultaneously. If the radio access device simultaneously transmits the third transport block in the two cells, the radio access device may transmit the third indication information through downlink control channels of the two cells, or may combine the third indication information corresponding to the two cells and transmit the third indication information through the downlink control channel of the cell 1 or the downlink control channel of the cell 2.

In addition, in the examples in FIG. 14 and FIG. 15, it is assumed that the radio access device transmits the third transport block once in the cell 1, and then transmits the third transport block once in the cell 2. Actually, the radio access device may transmit the third transport block for one or more times in the cell 1, and transmit the third transport block for one or more times in the cell 2. If the radio access device determines that the radio access device needs to transmit the third transport block for a plurality of times in the cell 1 or cell 2, the radio access device may transmit the third indication information for a plurality of times, where each third transport block corresponds to one piece of third indication information; or the radio access device may transmit the third indication information only once, that is, a plurality of third transport blocks correspond to a same piece of third indication information. Optionally, if the radio access device transmits the third indication information only once, and the third indication information corresponds to the plurality of third transport blocks, the third indication information may further include a redundancy version start indication, and the redundancy version start indication is used to indicate, to the terminal, a redundancy version used by a first third transport block in the plurality of third transport blocks. The terminal determines, based on the redundancy version start indication, the redundancy version used by the first third transport block, and then may deduce a redundancy version used for a third transport block sent by the radio access device subsequently.

It should be noted that because the radio access device may schedule current resources in a unified manner, the radio access device neither sends data to different terminals by using a same resource, nor transmits data by using a resource being used by each terminal. Therefore, the resource (e.g., the resource in the cell 1 and the resource in the cell 2 in FIG. 14 and FIG. 15) used by the radio access device to send the third transport block to the terminal does not collide with a resource used by another terminal. In this way, the resource used by the radio access device to send the third transport block to the terminal is not distinguished between a shared resource and a dedicated resource.

Further, using an example in which a base station is used as the radio access device, the terminal and the base station may transmit data in a dual connectivity manner, namely, a transmission mode in which one terminal is connected to both a master base station and a secondary base station.

Figure 16:
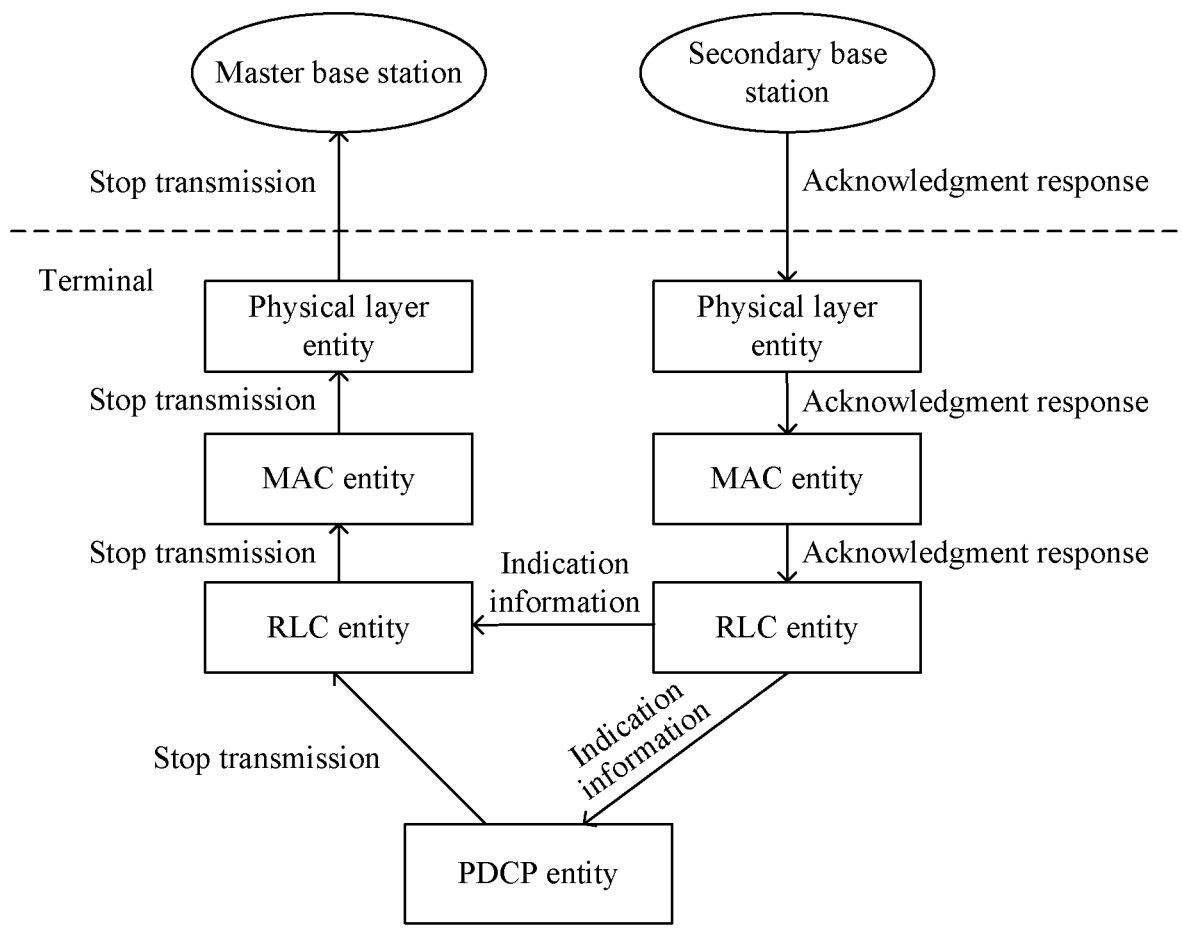
FIG. 16 is a schematic diagram 17 of an application scenario of a data transmission method according to an embodiment of the present application.

In this case, as shown in FIG. 16, two sets of protocol stacks are established in the terminal. Each set of protocol stacks include a physical layer entity, a MAC entity, and a radio link control (RLC) entity. In a transmission process, a packet data convergence protocol (PDCP) entity may transmit a same data packet from a non-access stratum to the master base station and the secondary base station separately by using the two sets of protocol stacks.

If transmission is successful by using one of the two sets of protocol stacks, for example, as shown in FIG. 16, if the secondary base station has sent an acknowledgment response to the data packet to the terminal, an RLC entity corresponding to the secondary base station may send indication information to an RLC entity corresponding to the master base station, to indicate that the data packet has been transmitted successfully. In addition, the RLC entity corresponding to the secondary base station may send the indication information to the PDCP entity, so that the terminal stops transmitting the data packet to the master base station and does not need to wait for an acknowledgment response to the data packet, which is sent by the master base station, thereby saving transmission resources.

In addition, because the URLLC data has a very high latency requirement, the radio access device may fail to allocate the dedicated resource to the terminal in time when transmitting the URLLC data to the terminal. In this case, the radio access device may preempt the dedicated resource that has been allocated to the another terminal, to send the URLLC data.

Figure 17:
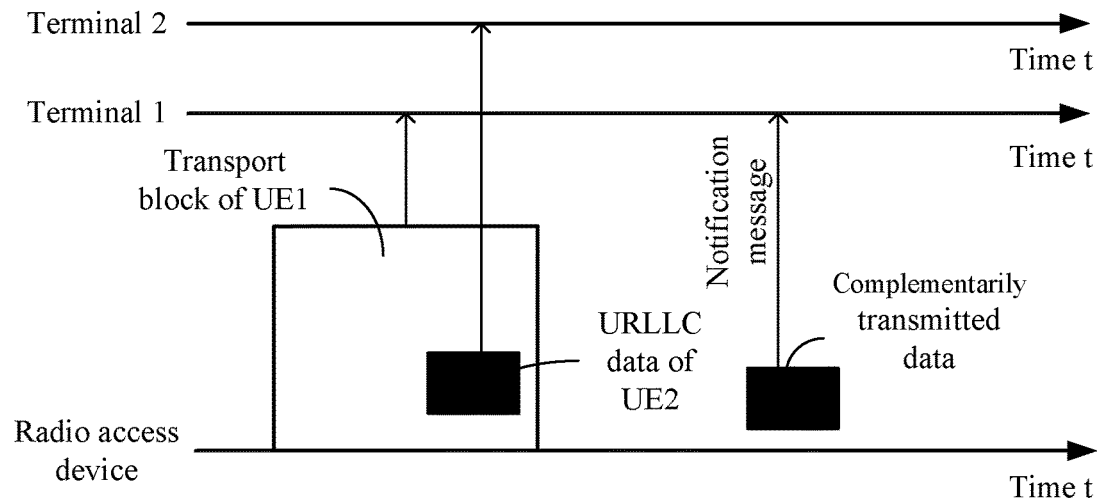
FIG. 17 is a schematic diagram 18 of an application scenario of a data transmission method according to an embodiment of the present application.

As shown in FIG. 17, the radio access device may puncture a transport block that needs to be sent to the terminal 1 and insert, into a punctured location, URLLC data that needs to be sent to the terminal 2. Subsequently, the radio access device sends punctured data (namely, complementarily transmitted data) to the terminal 1, or the radio access device sends, to the terminal 1, one or more redundancy transport sub-blocks corresponding to the transport block of the terminal 1. In addition, the radio access device may send a first notification message to the terminal 1 through a physical downlink control channel (PDCCH). The first notification message is used to indicate that this transmission process is a complementary transmission process, a used HARQ process ID is the same as that used in a previous transmission process, and this transmission process is not counted into a quantity of HARQ transmissions.

For example, after receiving the punctured transport block, the terminal 1 may start a timer CB-timer. A timer length of the timer CB-timer may be configured by the radio access device for the terminal 1 by using radio resource control (RRC) signaling. In this case, within a timing period of the timer CB-timer, the terminal 1 listens to the PDCCH to obtain the first notification message.

Alternatively, after sending the punctured transport block to the terminal 1, the radio access device may further send a second notification message to the terminal. The second notification message is used to indicate that the transport block transmitted by the radio access device last time is a punctured data block. In this way, after receiving the second notification message, the terminal 1 may start the timer CB-timer. Within the timing period of the timer CB-timer, the terminal 1 may listen to the PDCCH to obtain the first notification message or a data retransmission notification message.

In addition, the radio access device may puncture transport blocks of the plurality of terminals, to transmit a data block of the terminal 2. For example, the radio access device punctures data blocks of the terminal 1 and the terminal 3. In this case, the radio access device may send the second notification message to both the terminal 1 and the terminal 3, or may send the second notification message to the terminal 1 and the terminal 3 through a common transport channel. This is not limited in this embodiment of the present application.

Alternatively, after the terminal 1 receives the punctured transport block, if the terminal 1 fails to decode the transport block or the terminal 1 determines, in another manner, that the transport block is punctured, the terminal 1 may be triggered to listen to the PDCCH to obtain the first notification message or the data retransmission notification message.

To reduce interference as far as possible caused by the puncturing process to a data transmission process of the another terminal (e.g., the terminal 1), the radio access device may preconfigure some resources and notify each terminal of locations of these resources. If the radio access device needs to puncture and transmit the URLLC data subsequently, the radio access device may directly puncture these preconfigured resources. In this case, once the terminal 1 determines that a location of a resource occupied by a transport block transmitted by the terminal 1 overlaps with a location of a preconfigured resource, the terminal 1 may start the CB-timer. In this way, the terminal 1 may listen to the PDCCH within the timing period of the CB-timer to obtain the first notification message.

Figure 18:
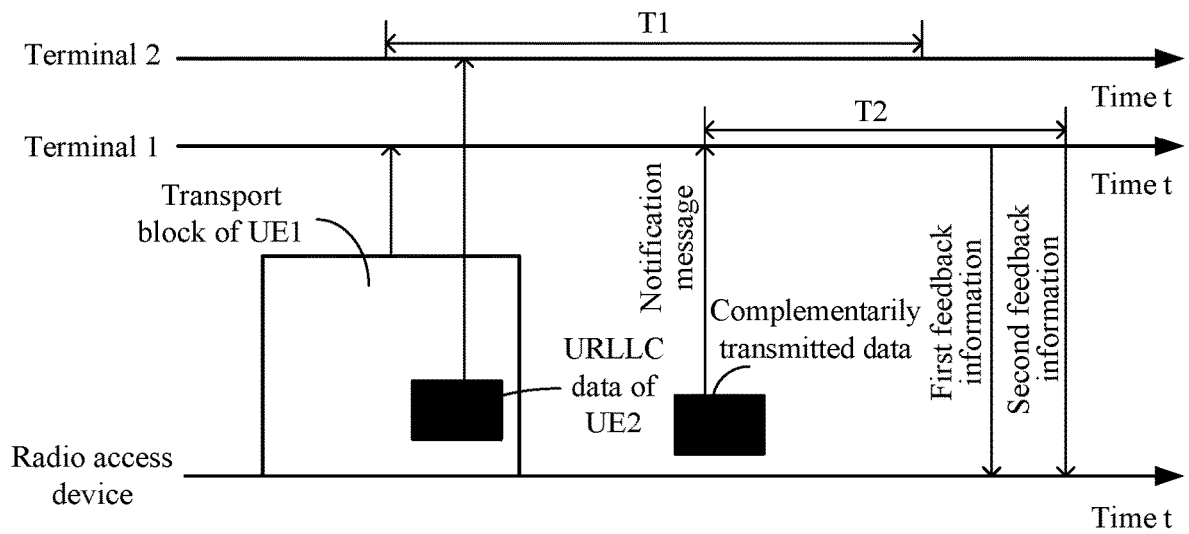
FIG. 18 is a schematic diagram 19 of an application scenario of a data transmission method according to an embodiment of the present application.

Further, as shown in FIG. 18, after receiving the complementarily transmitted data, the terminal 1 needs to send feedback information to the radio access device twice: first feedback information and second feedback information. The first feedback information is used to indicate that the terminal 1 has received the punctured transport block, and the second feedback information is used to indicate whether the terminal 1 performs decoding successfully after merging the complementarily transmitted data and the punctured transport block that are received. In this way, when the radio access device sends data to a specific terminal (e.g., the terminal 2) by using a resource of the another terminal (e.g., the terminal 1), the another terminal may be triggered to listen to the PDCCH to obtain the complementarily transmitted data sent by the radio access device, to reduce interference to the another terminal when the radio access device sends the URLLC data.

As shown in FIG. 18, a time T1 between receiving the punctured data by the terminal 1 and sending the first feedback information by the terminal 1 and a time T2 between receiving the complementarily transmitted data by the terminal 1 and sending the second feedback information by the terminal 1 may be two independent values respectively configured by using RRC signaling. Alternatively, a relationship between the T1 and the T2 may be configured, and if either one of the T1 and the T2 is determined, the other one may be determined based on the relationship between the T1 and the T2. The values of the T1 and the T2 may be the same or different. This is not limited in this embodiment of the present application.

An embodiment of the present application further provides a data transmission method, to enhance transmission reliability of URLLC data. When transmission on a same DRB may be performed in a plurality of cells, two copies of a URLLC data packet may be made, and are transmitted by two RLC entities.

Figure 19:
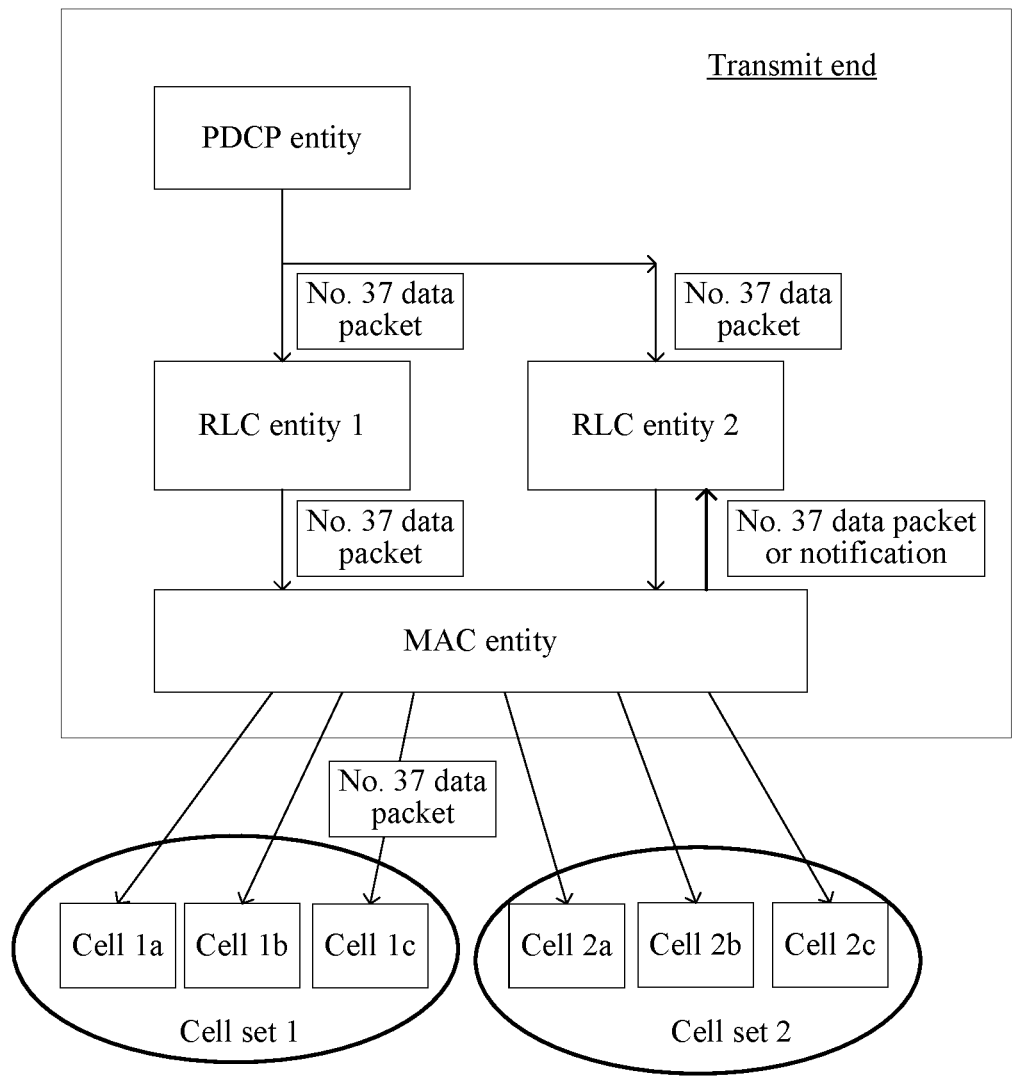
FIG. 19 is a schematic diagram 20 of an application scenario of a data transmission method according to an embodiment of the present application.

As shown in FIG. 19, a PDCP entity at a transmit end (which may be a terminal or a radio access device) may make at least two copies of a URLLC data packet, the at least two copies correspond to at least two RLC entities at an RLC layer. Without loss of generality, using two copies as an example, for example, a data packet 1 and a data packet 2 respectively correspond to two RLC entities at the RLC layer: an RLC entity 1 and an RLC entity 2. However, at a MAC layer, a MAC entity at the transmit end considers that the RLC entity 1 and the RLC entity 2 are two different RLC entities, but whether the two RLC entities correspond to two services or a same service is not distinguished.

As shown in FIG. 19, the radio access device may divide a cell to which the radio access device belongs, into two subsets in advance: a cell set 1 and a cell set 2. The two subsets do not overlap with each other. In this case, the transmit end may transmit, to a receive end in a cell of the cell set 1, the data packet 1 sent by the RLC entity 1 to the MAC entity. The transmit end may transmit, to the receive end in a cell of the cell set 2, the data packet 2 sent by the RLC entity 2 to the MAC entity.

In this way, the same URLLC data packet is inevitably transmitted in two different cells after being copied. This increases a time-frequency gain when the URLLC data packet is transmitted, and increases a probability that the URLLC data packet is correctly received.

Figure 20:
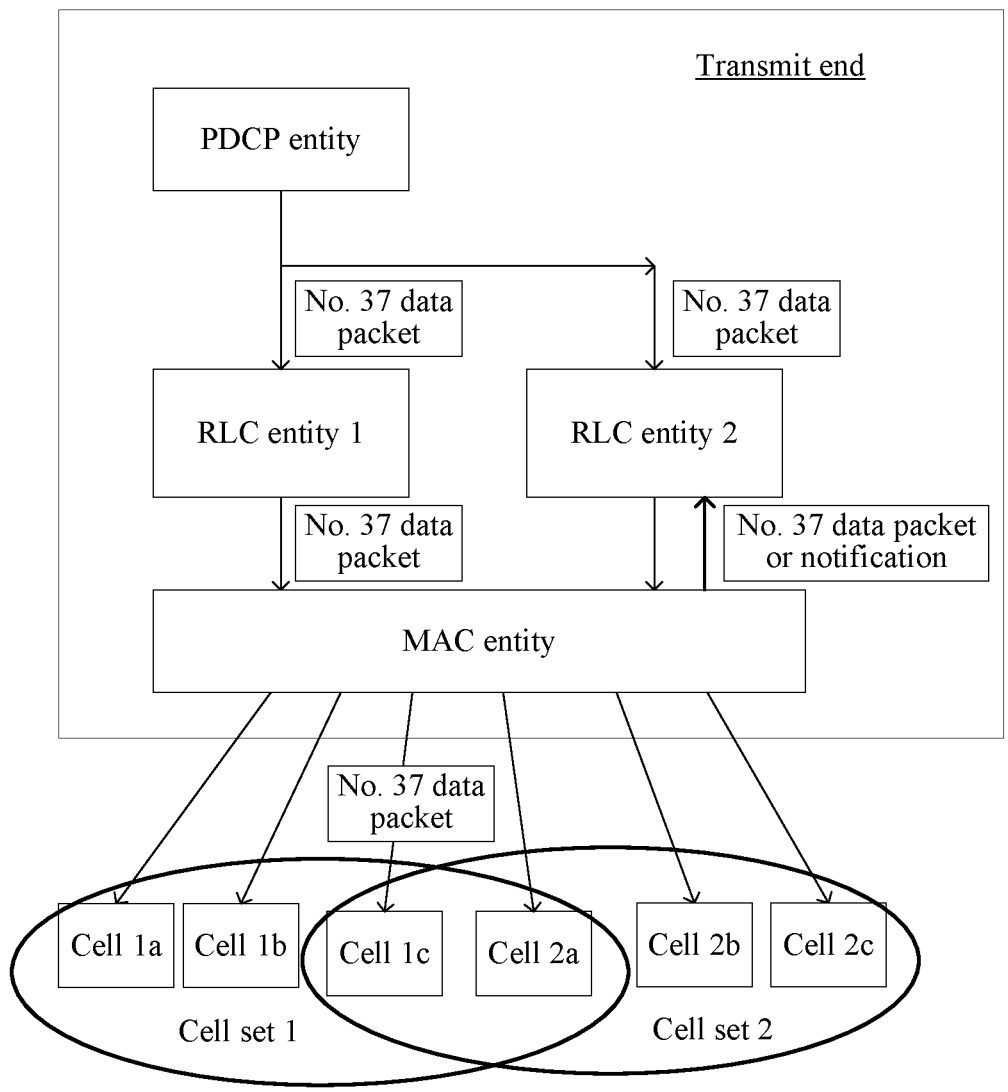
FIG. 20 is a schematic diagram 21 of an application scenario of a data transmission method according to an embodiment of the present application.

In another possible design method, as shown in FIG. 20, the cell set 1 may partially or completely overlap with the cell set 2.

In this case, the PDCP entity may make at least two copies of a URLLC data packet. In this scenario, a wireless communications system configures that a same PDCP entity may make at least two copies of a received URLLC data packet, and the PDCP entity makes a copy of all received URLLC data packets. Without loss of generality, using the data packet 1 and the data packet 2 as an example, a number of the data packet 1 in the RLC entity 1 is 37, and a number of the data packet 2 in the RLC entity 2 is also 37. In this case, as shown in FIG. 20, after the RLC entity 1 sends the No. 37 data packet to the MAC entity, the MAC entity transmits the No. 37 data packet to the receive end in a cell 1C. Then, the MAC entity not only sends a notification "the No. 37 data packet has been transmitted in the cell 1C" to the RLC entity 1, but also sends the notification "the No. 37 data packet has been transmitted in the cell 1C" to the RLC entity 2.

In this case, if the cell 1C has a transmission resource subsequently, because the RLC entity 2 has learned that the No. 37 data packet has been transmitted in the cell 1C, the RLC entity 2 no longer sends the No. 37 data packet to the MAC entity for transmission.

Alternatively, after the MAC entity transmits the No. 37 data packet to the receive end in the cell 1C, the MAC entity may directly send the No. 37 data packet to the RLC entity 2. In this case, the RLC entity 2 parses the No. 37 data packet and determines that the data packet is a No. 37 data packet buffered in the RLC entity 2, to determine that the No. 37 data packet has been transmitted in the cell 1C.

Figure 21:
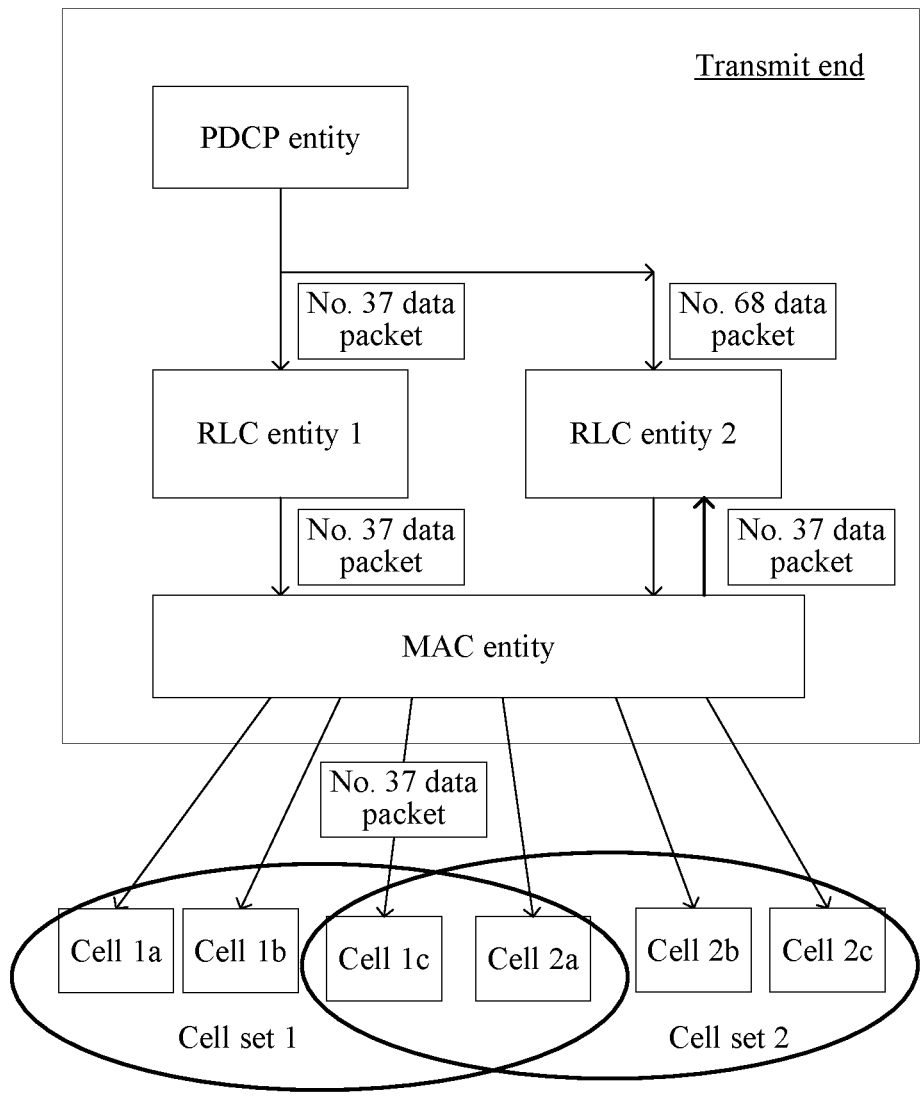
FIG. 21 is a schematic diagram 22 of an application scenario of a data transmission method according to an embodiment of the present application.

In another possible design method, a wireless communications system configures that a same PDCP entity may make at least two copies of received URLLC data. The PDCP entity may make at least two copies of all the received URLLC data based on the configuration, or may make no copy of the received URLLC data. In this scenario, a same data packet may have different numbers at the RLC layer. As shown in FIG. 21, the cell set 1 overlaps with the cell set 2. A difference is that, after the PDCP entity makes two copies of a URLLC data packet, a number of one copy in the RLC entity 1 may be 37, and a number of the other copy in the RLC entity 2 may be another number different from 37, for example, 68.

In this case, as shown in FIG. 21, after the RLC1 entity sends the No. 37 data packet to the MAC entity, the MAC entity transmits the No. 37 data packet to the receive end in the cell 1C. Then, the MAC entity directly sends the No. 37 data packet to the RLC entity 2, and the RLC entity 2 may parse the No. 37 data packet and determine that the data packet is a No. 68 data packet buffered in the RLC entity 2, to determine that the No. 68 data packet in the RLC entity 2 has been transmitted in the cell 1C. The MAC entity selects another cell different from Cell 1C to transmit the No. 68 data packet.

In this case, if the cell 1C has a transmission resource subsequently, because the RLC entity 2 has learned that the No. 68 data packet has been transmitted in the cell 1C, the RLC entity 2 does not need to send the No. 68 data packet to the MAC entity for transmission.

Figure 22:
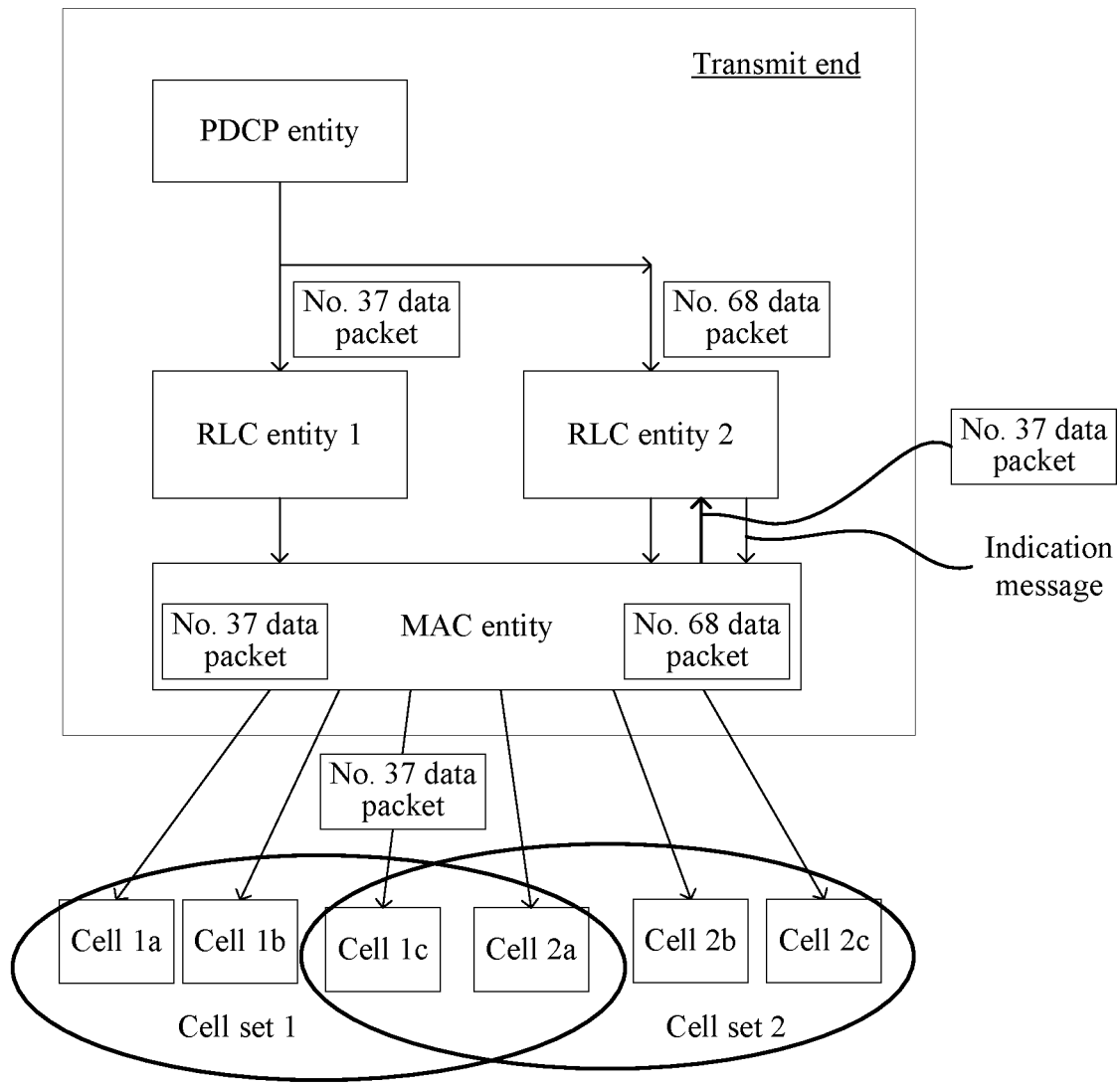
FIG. 22 is a schematic diagram 23 of an application scenario of a data transmission method according to an embodiment of the present application.

In another possible design method, as shown in FIG. 22, the cell set 1 overlaps with the cell set 2. In addition, after the PDCP entity makes two copies of a URLLC data packet, a number of one copy in the RLC entity 1 may be 37, and a number of the other copy in the RLC entity 2 may be another number different from 37, for example, 68.

A different is that, to increase a packet assembly speed of the MAC entity, the RLC entity processes some data packets in advance and sends the processed data packets to the MAC entity, and the MAC entity temporarily buffers these data packets. In this way, the MAC entity can directly transmit these data packets after obtaining an output resource.

In this case, if both the No. 37 data packet and the No. 68 data packet are stored in a buffer of the MAC entity, the MAC entity sends the No. 37 data packet to the RLC entity 2 if the No. 37 data packet is transmitted in the cell 1C, and the RLC entity 2 can determine that a number of the No. 37 data packet in the RLC entity 2 is 68, to send an indication message to notify the MAC entity of "the No. 68 data packet in the RLC entity 2 has been transmitted in the cell 1C". In this way, if a transmission resource is available in the cell 1C subsequently, because the MAC entity has learned that the No. 68 data packet has been transmitted in the cell 1C, the MAC entity does not need to transmit the No. 68 data packet in the cell 1C.

Further, if a transmission resource is currently available in a specific overlapped cell (e.g., the cell 1C), and the No. 37 data packet and the No. 68 data packet have not been sent to the receive end, the MAC entity may select an RLC entity with a larger amount of buffered data or an RLC entity with a larger quantity of tokens in a token bucket of a logical channel as a target RLC entity or randomly select an RLC entity as a target RLC entity, for example, select the RCL entity 1 as the target RLC entity, and then obtain a data packet from the target RLC entity for transmission, to avoid that a same data packet is transmitted in a same cell.

Figure 23:
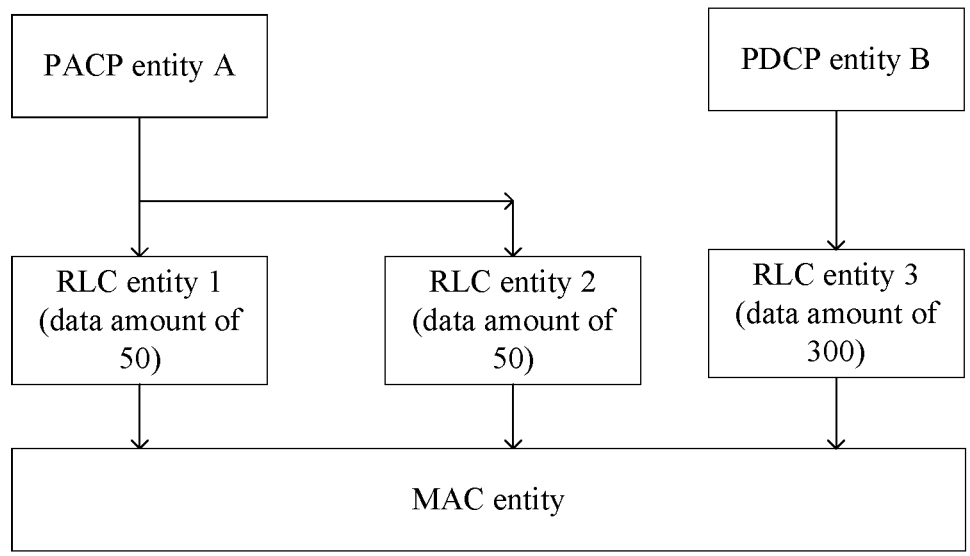
FIG. 23 is a schematic diagram 24 of an application scenario of a data transmission method according to an embodiment of the present application.

In a possible design method, as shown in FIG. 23, the terminal (the transmit end) may maintain two or more sets of RLC entities, for example, a PDCP entity B and an RLC entity 3 in FIG. 23. The PDCP entity B does not make a plurality of copies of a data packet for transmission. In this case, after determining the target RLC entity such as the RLC entity 1, the transmit end may transmit target data of a logical channel corresponding to the RLC entity 1. If a current available resource is insufficient to transmit the target data, the terminal may trigger a buffer status report (BSR) to inform the radio access device that the terminal further needs more resources to transmit remaining target data.

In this case, if all data in a buffer of the terminal has been completely transmitted, or data in the buffer has been reported in the BSR to the radio access device, the terminal may cancel triggering of sending the BSR. If there is data in the buffer that has not been transmitted, the terminal does not cancel the triggered BSR.

It should be noted that the terminal may determine whether wanted data of all RLC entities is all sent at the RLC layer. The wanted data is data that can be added to a currently-to-be-transmitted transport block at the MAC layer. If the wanted data of all the RLC entities has not been sent completely, and a BSR has not been sent, the terminal keeps a triggering state of the BSR. If the wanted data has been sent completely, the terminal cancels a triggering state of the BSR. If the wanted data of all the RLC entities has not been sent completely, and the BSR has been sent to the radio access device, the terminal cancels a triggering state of the BSR.

When two logical channels LCH (e.g., the RLC entity 1 and the RLC entity 2 in FIG. 22) are configured for a same data radio bearer DRB for duplicate redundancy transmission, after UE receives an uplink grant including an uplink transmission resource, the UE selects, if the two LCHs are mapped to the uplink transmission resource (from the cell 1C or a cell 2a) included in the uplink grant, either one of the LCHs (either the RLC entity 1 or the RLC entity 2) to participate an LCP process (when one TB is generated, only data of either the RLC entity 1 or the RLC entity 2 is added to the TB).

For a TB, if all wanted data is added to the TB but there is data of another duplicate RLC entity that has not been transmitted, the MAC does not cancel BSR triggering.

For example, it is assumed that a size of to-be-transmitted target data of the RLC entity 1 (a target RLC entity) is 50, and a size of to-be-transmitted data of the RLC entity 3 is 300. In this case, the data can be sent completely if a size of a current available resource is 350.

In an example, two groups of entities at a PDCP layer have data packets. A first group of entities includes at least one PDCP entity, and a second group of entities includes at least one PDCP entity. Each PDCP entity in the first group of entities does not make a copy of a data packet and generates an RLC data packet at the RLC layer, and one PDCP entity corresponds to one RLC entity. Each PDCP entity in the second group of entities makes two copies of a data packet, each PDCP entity generates at least two RLC data packets at the RLC layer, and one PDCP entity corresponds to at least two RLC entities. The two groups of PDCP entities are mapped to one MAC entity at the MAC layer. In a process in which the MAC entity generates a transport block (TB) and transmits the transport block to the physical layer, the TB includes data of one of the at least two RLC entities corresponding to at least one PDCP entity in the second group. Optionally, the TB may not include data of at least one RLC entity corresponding to the first group of PDCP entities. The TB may alternatively include data of at least one RLC entity corresponding to the first group of PDCP entities.

Without loss of generality, the PDCP layer includes a PDCP entity A and the PDCP entity B. The PDCP entity A makes at least two copies of a data packet, and the PDCP entity A corresponds to at least two RLC entities at the RLC layer (without loss of generality, the RLC entity 1 and the RLC entity 2 are used as an example). The PDCP entity B generates only one piece of data at the RLC layer, and corresponds to one RLC entity 3 at the RLC layer. Data of the RLC entity 1 and the RLC entity 2 may be the same. When a TB is generated at the MAC layer, data of either the RLC entity 1 or the RLC entity 2 is added to the TB. Optionally, all data of the RLC entity 3 is added to the TB. In other words, the TB includes data of the RLC entity 1 and does not include data of the RLC entity 2; or the TB includes data of the RLC entity 2 and does not include data of the RLC entity 1.

Applied to the foregoing embodiments of the present application, during reporting of a BSR, an amount of to-be-transmitted data collected by the MAC entity at the MAC layer is a sum of the following data amounts: an amount of currently-to-be-transmitted data of all PDCP entities in the first group of PDCP entities, an amount of to-be-transmitted data of all RLC entities corresponding to all the PDCP entities in the first group of PDCP entities, an amount of currently-to-be-transmitted data of each PDCP entity in the second group of PDCP entities×a quantity of copies of a data packet made by each PDCP entity, and an amount of to-be-transmitted data of each of the at least two RLC entities that corresponds to each PDCP entity in the second group. A result of the data amount of each PDCP entity in the second group of PDCP entities×the quantity of copies of a data packet made by each PDCP may be calculated by each PDCP entity in the second group and informed to the MAC entity, or may be calculated by the MAC entity.

Herein, assuming that a quantity of PDCP entities in the first group is n, amounts of to-be-transmitted data of all PDCP entities are $d_1, \ldots,$ and $d_n$, each PDCP entity is mapped to one RLC entity, and n RLC entities are mapped to in total, amounts of to-be-transmitted data of all RLC entities are $r_1, \ldots,$ and m. Assuming that a quantity of PDCP entities in the second group is m, currently to-be-transmitted data of all PDCP entities is $D_1, \ldots,$ and $D_m$, amounts of data that has been transmitted by each PDCP to the RLC layer are $rr_1, \ldots,$ and $rr_m$, and copies made are $p_1, \ldots,$ and $p_m$, quantities of RLC entities to which each PDCP entity is mapped to are $p_1, \ldots,$ and $p_m$. The amount of to-be-transmitted data collected by the MAC entity is:

$$(d_1 + \cdots + d_n) + (r_1 + \cdots + r_m) + (D_1 \times p_1 + D_2 \times p_2 + \ldots + D_m \times p_m) + (rr_1 + \ldots + rr_m).$$

Still in the foregoing example, a size of currently-to-be-transmitted data of the PDCP entity A is 70, a size of data that has been transmitted to the RLC layer is 50, there are two copies of data, and amounts of data of the RLC entity 1 and the RLC entity 2 at the RLC layer each are 50. A size of currently-to-be-transmitted data of the PDCP entity B is 300, a size of data that has been transmitted to the RLC layer is 300, and an amount of data of the corresponding RLC entity 3 is 100. The PDCP entity A and the PDCP entity B correspond to one MAC entity at the MAC layer. The MAC layer collects statistics about an amount of to-be-transmitted data in the BSR based on an amount of to-be-transmitted data of each RLC entity and an amount of to-be-transmitted data of all the PDCP entities: 300 (an amount of data of the PDCP entity B)+300 (an amount of data of the RLC entity 3 corresponding to the PDCP entity B)+70 (an amount of data of the PDCP entity A)×2 (a quantity of copies of a data packet)+50 (an amount of data of the RLC entity 1 corresponding to the PDCP entity A)+50(an amount of data of the RLC entity 2 corresponding to the PDCP entity A). The amount of to-be-transmitted data in the BSR may be an amount of to-be-transmitted data that is reported by each PDCP entity to the MAC layer. The PDCP entity reports an amount of to-be-transmitted data of 70×2=140 to the MAC layer, and the PDCP entity B reports an amount of to-be-transmitted data of 300 to the MAC layer. The amount of to-be-transmitted data in the BSR collected by the MAC layer is 140 (an amount of data of the PDCP entity A×a quantity of copies)+50 (the RLC entity 1)+50 (the RLC entity 2)+300 (an amount of data of the PDCP entity B)+300 (the RLC entity 3). It can be understood that the MAC layer collects amounts of to-be-transmitted data at the PDCP layer and the RLC layer. Optionally, an amount of to-be-transmitted data at an SDAP layer is introduced into a wireless communications system. An amount of currently-to-be transmitted data at the SDAP layer×a quantity of duplicates at the RLC layer may be further added to the foregoing statistic results when the MAC layer calculates the data amount.

It can be learned that although a size of an available resource in a current TB is 350, all data supposed to be added to one TB cannot be transmitted completely in the TB because the PDCP entity makes a copy of a data packet. The triggering state of the BSR in this case is not canceled. The triggering of the BSR can be canceled after data of all the RLC entities has been transmitted completely.

Figure 24:
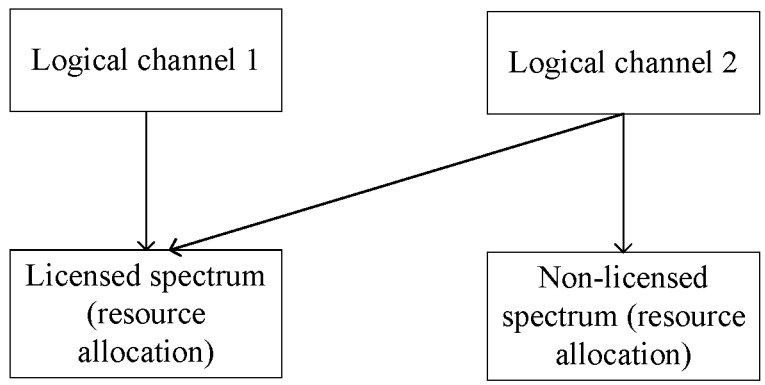
FIG. 24 is a schematic diagram 25 of an application scenario of a data transmission method according to an embodiment of the present application.

An embodiment of the present application further provides a data transmission method, as shown in FIG. 24. At least two cells simultaneously provide a communication service to a terminal. A first cell operates on a licensed spectrum, a second cell operates on a non-licensed spectrum, a logical channel 1 (LCH1) that can be used by the terminal provides data transmission only in the first cell, and a logical channel 2 (LCH2) that can be used by the terminal provides data transmission in at least one of the first cell and the second cell. If there is data to be transmitted on the logical channel 1, but a resource on a non-licensed spectrum is allocated to the terminal and no resource on the licensed spectrum is allocated to the terminal, the terminal cannot transmit the data on the logical channel 1 by using the resource on the non-licensed spectrum in this case. If there is data to be transmitted on the logical channel 2, the data may be transmitted in the second cell on the logical channel 2 by using the resource on the non-licensed spectrum. If the resource on the licensed spectrum is allocated to the terminal, the terminal transmits the data on the logical channel 1 by using the resource on the licensed spectrum, or may transmit the data on the logical channel 2 by using the resource on the licensed spectrum.

Figure 25:
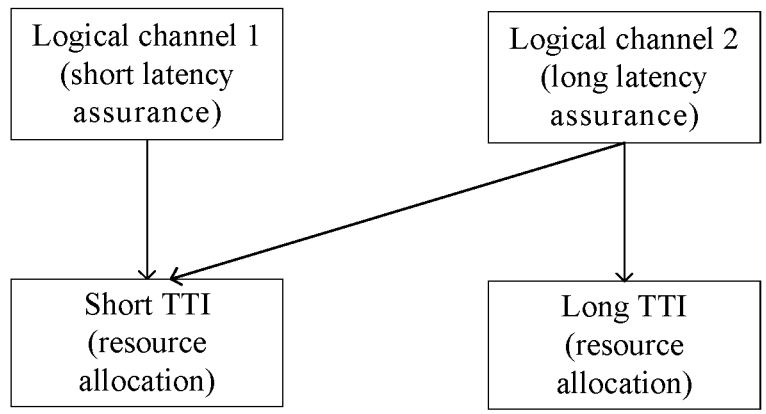
FIG. 25 is a schematic diagram 26 of an application scenario of a data transmission method according to an embodiment of the present application.

As shown in FIG. 25, at least two cells simultaneously provide a communication service to a terminal. A first cell operates in a first air interface format, and the first air interface format uses a short transmission time interval (TTI) to implement service assurance for a short latency requirement. A second cell operates in a second air interface format, and the second air interface format uses a long transmission time interval TTI to implement service assurance for a long latency requirement.

Data to be transmitted on a logical channel 1 (LCH1) that can be used by the terminal requires a short latency. Therefore, the logical channel 1 transmits data only in the first cell. Data to be transmitted on a logical channel 2 (LCH2) that can be used by the terminal requires a long latency. Therefore, the logical channel 2 may transmit data in at least one of the first cell and the second cell. The terminal is allocated a resource in the second air interface format and no resource in the first air interface format. If there is data to be transmitted on the logical channel 1, the terminal cannot transmit the data on the logical channel 1 by using the first air interface format. Optionally, the terminal may send the data on the logical channel 1 by using the resource in the second air interface format. However, the terminal still notifies a base station of to-be-sent data on the logical channel 1 and an amount of the to-be-sent data on the logical channel 1. The amount of the to-be-sent data notified by the terminal includes an amount of data on the logical channel 1 that is sent in the second air interface format (the terminal still considers that this part of data amount has not been sent; in this case, the terminal does not trigger a BSR if a priority of newly transmitted data is lower than a priority of this part of data).

The foregoing mainly describes, from the perspective of interaction between network elements, the solutions provided in the embodiments of the present application. It can be understood that, to implement the foregoing functions, the terminal, the radio access device, and the like include corresponding hardware structures and/or software modules for performing the functions. A person skilled in the art may be easily aware that, units and algorithm steps of each example described in combination with the embodiments disclosed in the specification can be implemented by hardware or a combination of hardware and computer software in the present application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the present application.

In the embodiments of the present application, the terminal and the like may be divided into function modules based on the foregoing method examples. For example, function modules corresponding to various functions may be obtained through division, or two or more functions may be integrated into one processing module. The integrated module may be implemented in a form of hardware, or may be implemented in a form of a software functional module. It should be noted that the unit division in the embodiments of the present application is an example, is merely logical function division, and may be other division in actual implementation.

Figure 26:
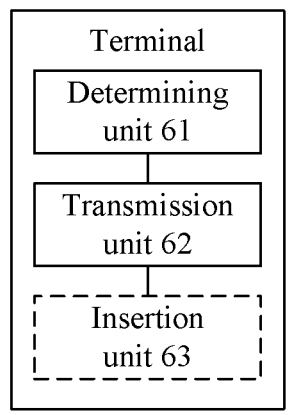
FIG. 26 is a schematic structural diagram 2 of a terminal according to an embodiment of the present application.

For the division into functional modules corresponding to functions, FIG. 26 is a possible schematic structural diagram of the terminal used in the foregoing embodiments. The terminal includes a determining unit 61, a transmission unit 62, and an insertion unit 63.

The determining unit 61 is configured to support the terminal in performing process 103 in FIG. 4; the transmission unit 62 is configured to support the terminal in performing processes 101, 102, and 104 in FIG. 4; and the insertion unit 63 is configured to insert first indication information into a first transport block, where the first indication information includes a HARQ process identification and an NDI that are of the first transport block transmitted by the terminal. For function descriptions of the corresponding function modules, refer to all related content of the steps in the foregoing method embodiments. Details are not described herein again.

Figure 27:
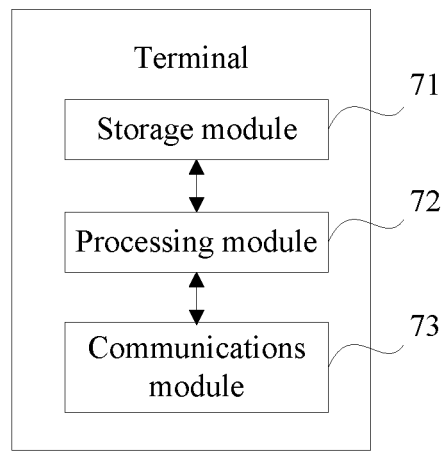
FIG. 27 is a schematic structural diagram 3 of a terminal according to an embodiment of the present application.

When an integrated unit is used, FIG. 27 is a possible schematic structural diagram of the terminal used in the foregoing embodiments. The terminal includes a processing module 72 and a communications module 73. The processing module 72 is configured to control and manage actions of the terminal. For example, the processing module 72 is configured to support the terminal in performing processes 101 to 104 in FIG. 4, and/or is applied to other processes of technologies described herein. The communications module 73 is configured to support communication between the terminal and another network entity. The terminal may further include a storage module 71, configured to store program code and data of the terminal.

The processing module 72 may be a processor or a controller, such as a central processing unit (CPU), a general purpose processor, a digital signal processor (DSP), an application-specific integrated circuit (ASIC), a field programmable gate array (FPGA), or another programmable logic device, a transistor logic device, a hardware component, or a combination thereof. The processor/controller may implement or execute various example logical blocks, modules, and circuits described with reference to content disclosed in the present application. Alternatively, the processor may be a combination of processors implementing a computing function, for example, a combination of one or more microprocessors, or a combination of the DSP and a microprocessor. The communications module 73 may be a transceiver, a transceiver circuit, a communications interface, or the like. The storage module 61 may be a memory.

When the processing module 72 is the processor, the communications module 73 is the transceiver, and the storage module 71 is the memory, the terminal used in this embodiment of the present application may be the computer device 500 shown in FIG. 3.

Further, an embodiment of the present application provides a data transmission system. The system includes the foregoing terminal and a radio access device connected to the terminal.

Further, an embodiment of the present application further provides a computer program. The computer program includes an instruction, and when the computer program is executed by a computer, the computer may perform the data transmission method related to the foregoing steps 101 to 104.

Further, an embodiment of the present application further provides a computer storage medium, configured to store a computer software instruction used by the foregoing terminal. The computer software instruction includes any program designed for the foregoing terminal.

A person skilled in the art can understand, according to the technical solution provided in the embodiments of the present application, processing actions such as determining and obtaining by the terminal in the foregoing method embodiments may be implemented by at least one processor of the terminal, the receiving action may be implemented by a receiver of the terminal, and the sending action may be implemented by a transmitter of the terminal. Processing actions such as determining and obtaining by the radio access device in the foregoing method embodiments may be implemented by at least one processor of the radio access device, the receiving action may be implemented by a receiver of the radio access device, and the sending action may be implemented by a transmitter of the radio access device. A person skilled in the art may define basic structure implementations of the radio access device and the terminal based on all the actions in the method embodiments. Details are not described herein.

A person skilled in the art should be aware that in the foregoing one or more examples, functions described in the present application may be implemented by hardware, software, firmware, or any combination thereof. When the present application is implemented by software, the foregoing functions may be stored in a computer readable medium or transmitted as one or more instructions or code in the computer readable medium. The computer readable medium includes a computer storage medium and a communications medium, where the communications medium includes any medium that enables a computer program to be transmitted from one place to another. The storage medium may be any available medium accessible to a general-purpose or dedicated computer.

The objectives, technical solutions, and beneficial effects of the present application are further described in detail in the foregoing specific implementations. It should be understood that the foregoing descriptions are merely specific implementations of the present application, but are not intended to limit the protection scope of the present application. Any variation or replacement made within the technical scope disclosed in the present application shall fall within the protection scope of the present application. Therefore, the protection scope of the present application shall be subject to the protection scope of the claims.

What is claimed is:

1. A data transmission method by a terminal, the method comprising:
sending a first transport block to a radio access device for X times, by using a shared resource, wherein X is an integer >0, wherein the first transport block that is sent by the terminal using the shared resource is inserted with a hybrid automatic repeat request (HARQ) process identifier for transmitting the first transport block each particular time of the X times and a new data indicator (NDI) for the particular time of the X times, and wherein the NDI indicates whether the first transport block comprises new data or retransmitted data;
determining a dedicated resource that is allocated for the terminal by the radio access device; and
sending the first transport block to the radio access device for Y times by using the dedicated resource, wherein Y is an integer >0.

2. The method according to claim 1, wherein the sending the first transport block to the radio access device for Y times by using the dedicated resource comprises:
sending the first transport block for Y times by using the dedicated resource within a transmission time unit,
wherein the transmission time unit comprises:
the dedicated resource, and
the shared resource.

3. The method according to claim 1, wherein the shared resource is:
a radio resource allocated by the radio access device, and shared with at least one terminal.

4. The method according to claim 1, wherein the shared resource is a radio resource without a dynamic grant from the radio access device.

5. The method according to claim 1, wherein the shared resource is located within each of Z transmission time units and where Z≥X, and wherein the method further comprises:
obtaining a transmission request of a second transport block within an $M^{th}$ transmission time unit in the Z transmission time units; and
sending, in accordance with the obtaining, the first transport block within the $M^{th}$ transmission time unit using the shared resource within the $M^{th}$ transmission time unit, wherein the $M^{th}$ transmission time unit is a transmission time unit, other than the first transmission time unit, in the Z transmission time units.

6. The method according to claim 1, wherein the determining the dedicated resource allocated by the radio access device for the terminal comprises:
receiving a resource allocation information sent by the radio access device,
wherein the resource allocation information indicates the dedicated resource required for sending the first transport block;
wherein the resource allocation information comprises second indication information, and
wherein the second indication information instructs the terminal to repeatedly send the first transport block transmitted within a transmission time unit K, where K≥0.

7. An apparatus, comprising:
a transmitter, and
a processor; and
a non-transitory computer-readable medium including computer-executable instructions that, when executed by the processor, facilitate performing a method comprising:
sending, by the transmitter cooperatively operating with the processor, a first transport block to a radio access device for X times by using a shared resource, wherein X is an integer >0, the first transport block that is sent using the shared resource is inserted with a hybrid automatic repeat request (HARQ) process identifier for transmitting the first transport block each particular time of the X times and a new data indicator (NDI) for each particular time of the X times; wherein the NDI indicates whether the first transport block comprises new data or retransmitted data;
determining, by the processor, a dedicated resource that is allocated for the apparatus by the radio access device; and
sending, by the transmitter cooperatively operating with the processor, the first transport block to the radio access device for Y times by using the dedicated resource, wherein Y is an integer >0.

8. The apparatus according to claim 7, wherein the method further comprises:
sending, by the transmitter cooperatively operating with the processor, the first transport block for Y times by using the dedicated resource within a transmission time unit,
wherein the transmission time unit comprises both:
the dedicated resource, and
the shared resource.

9. The apparatus according to claim 7, wherein the shared resource is:
a radio resource allocated by the radio access device, and shared with at least one terminal.

10. The apparatus according to claim 7, wherein the shared resource is a radio resource without a dynamic grant from the radio access device.

11. The apparatus according to claim 7, wherein the shared resource is located within each of Z transmission time units, and where Z≥X; and
wherein the method carried out on the apparatus comprises:
obtaining a transmission request of a second transport block within an $M^{th}$ transmission time unit in the Z transmission time units; and
sending, in accordance with the obtaining by the transmitter cooperatively operating with the processor, the first transport block within the $M^{th}$ transmission time unit using the shared resource within the $M^{th}$ transmission time unit wherein the $M^{th}$ transmission time unit is a transmission time unit, other than the first transmission time unit, in the Z transmission time units.

12. The apparatus according to claim 7, wherein the transmitter is further configured, during the determining the dedicated resource allocated by the radio access device for the apparatus to:
receive a resource allocation information sent by the radio access device,
wherein the resource allocation information indicates the dedicated resource required by the apparatus for sending the first transport block,
wherein the resource allocation information comprises second indication information, and
wherein the second indication information instructs the apparatus to repeatedly send the first transport block transmitted within a transmission time unit K, and the transmission time unit K is a transmission time unit prior to a transmission time unit within which the resource allocation information is received, where K≥0.

13. A non-transitory computer readable medium comprising:
computer-executable instructions, wherein the computer-executable instructions, when executed, facilitate a terminal performing a method comprising:
sending a first transport block to a radio access device for X times, by using a shared resource and wherein X is an integer >0, wherein the first transport block that is sent using the shared resource is inserted with a hybrid automatic repeat request (HARQ) process identifier for transmitting the first transport block each particular time of the X times and a new data indicator (NDI) for each particular time of the X times; wherein the NDI indicates whether the first transport block comprises new data or retransmitted data;
determining a dedicated resource that is allocated for the terminal by the radio access device; and
sending the first transport block to the radio access device for Y times by using the dedicated resource, and wherein Y is an integer >0.

14. The non-transitory computer readable medium according to claim 13, wherein the sending the first transport block to the radio access device for Y times by using the dedicated resource comprises:
sending the first transport block for Y times by using the dedicated resource within a transmission time unit,
wherein the transmission time unit comprises both:
the dedicated resource, and
the shared resource.

15. The non-transitory computer readable medium according to claim 13, wherein the shared resource is:
a radio resource allocated by the radio access device, and shared with at least one terminal.

16. The non-transitory computer readable medium according to claim 13, wherein the shared resource is a radio resource without a dynamic grant from the radio access device.

17. The non-transitory computer readable medium according to claim 13, wherein the shared resource is located within each of Z transmission time units and where Z≥X, and the method further comprises:
- obtaining a transmission request of a second transport block within an $M^{th}$ transmission time unit in the Z transmission time units; and
- sending, in accordance with the obtaining, the first transport block within the $M^{th}$ transmission time unit using the shared resource within the $M^{th}$ transmission time unit, wherein the $M^{th}$ transmission time unit is a transmission time unit, other than the first transmission time unit, in the Z transmission time units.

\* \* \* \* \*